(12) United States Patent
Mimura et al.

(10) Patent No.: US 10,644,349 B2
(45) Date of Patent: May 5, 2020

(54) ALL SOLID-STATE SECONDARY BATTERY, SOLID ELECTROLYTE COMPOSITION, ELECTRODE SHEET FOR BATTERY USING SAME, METHOD FOR MANUFACTURING ELECTRODE SHEET FOR BATTERY, AND METHOD FOR MANUFACTURING ALL SOLID-STATE SECONDARY BATTERY

(71) Applicant: FUJIFILM Corporation, Tokyo (JP)

(72) Inventors: Tomonori Mimura, Ashigarakami-gun (JP); Hiroaki Mochizuki, Ashigarakami-gun (JP); Masaomi Makino, Ashigarakami-gun (JP); Katsuhiko Meguro, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 315 days.

(21) Appl. No.: 15/412,422

(22) Filed: Jan. 23, 2017

(65) Prior Publication Data

US 2017/0133712 A1     May 11, 2017

Related U.S. Application Data

(63) Continuation of application No. PCT/JP2015/071641, filed on Jul. 30, 2015.

(30) Foreign Application Priority Data

Jul. 31, 2014    (JP) ................................ 2014-156839

(51) Int. Cl.
    *H01M 10/0562*     (2010.01)
    *H01M 4/131*     (2010.01)
    (Continued)

(52) U.S. Cl.
    CPC ....... *H01M 10/0562* (2013.01); *H01M 4/043* (2013.01); *H01M 4/0404* (2013.01);
    (Continued)

(58) Field of Classification Search
    CPC .......... H01M 10/052; H01M 10/0525; H01M 10/0562; H01M 2004/027;
    (Continued)

(56) References Cited

U.S. PATENT DOCUMENTS

2011/0076570 A1    3/2011   Hama et al.
2013/0040206 A1    2/2013   Yoshida et al.
(Continued)

FOREIGN PATENT DOCUMENTS

JP         11-86899     *   3/1999   ............ H01M 10/36
JP         2010-106252 A     5/2010
(Continued)

OTHER PUBLICATIONS

International Preliminary Report on Patentability and English translation of Written Opinion of the International Search Authority, issued in PCT/JP2015/071641, dated Jan. 31, 2017 (Forms PCT/IB/373 and PCT/ISA/237).
(Continued)

*Primary Examiner* — Carlos Barcena
(74) *Attorney, Agent, or Firm* — Birch, Stewart, Kolasch & Birch, LLP

(57) ABSTRACT

An all solid-state secondary battery including: a positive electrode active material layer, a negative electrode active material layer, and a solid electrolyte layer, in which at least any one of the positive electrode active material layer, the negative electrode active material layer, or the solid electrolyte layer includes an inorganic solid electrolyte having a property of conducting ions of a metal belonging to Group (Continued)

I or II of the periodic table and a binder constituted of a specific high-molecular-weight compound.

17 Claims, 1 Drawing Sheet

(51) Int. Cl.
| | | |
|---|---|---|
| *H01M 4/133* | (2010.01) | |
| *H01M 4/505* | (2010.01) | |
| *H01M 4/485* | (2010.01) | |
| *H01M 4/1393* | (2010.01) | |
| *H01M 4/587* | (2010.01) | |
| *H01M 4/62* | (2006.01) | |
| *H01M 4/66* | (2006.01) | |
| *H01M 4/1391* | (2010.01) | |
| *H01M 4/04* | (2006.01) | |
| *H01M 4/525* | (2010.01) | |
| *H01M 10/0525* | (2010.01) | |
| *H01M 10/052* | (2010.01) | |
| *H01M 4/38* | (2006.01) | |
| *H01M 4/58* | (2010.01) | |
| *H01M 4/02* | (2006.01) | |

(52) U.S. Cl.
CPC ......... *H01M 4/0471* (2013.01); *H01M 4/131* (2013.01); *H01M 4/133* (2013.01); *H01M 4/1391* (2013.01); *H01M 4/1393* (2013.01); *H01M 4/485* (2013.01); *H01M 4/505* (2013.01); *H01M 4/525* (2013.01); *H01M 4/587* (2013.01); *H01M 4/62* (2013.01); *H01M 4/622* (2013.01); *H01M 4/625* (2013.01); *H01M 4/661* (2013.01); *H01M 10/052* (2013.01); *H01M 10/0525* (2013.01); *H01M 4/386* (2013.01); *H01M 4/5825* (2013.01); *H01M 2004/027* (2013.01); *H01M 2004/028* (2013.01); *H01M 2300/0068* (2013.01); *H01M 2300/0071* (2013.01); *Y02T 10/7011* (2013.01)

(58) Field of Classification Search
CPC ... H01M 2004/028; H01M 2300/0068; H01M 2300/0071; H01M 4/0404; H01M 4/043; H01M 4/0471; H01M 4/131; H01M 4/133; H01M 4/1391; H01M 4/1393; H01M 4/386; H01M 4/485; H01M 4/505; H01M 4/525; H01M 4/5825; H01M 4/587; H01M 4/62; H01M 4/622; H01M 4/625; H01M 4/661
See application file for complete search history.

(56) References Cited

U.S. PATENT DOCUMENTS

| | | |
|---|---|---|
| 2013/0260241 A1 | 10/2013 | Sone et al. |
| 2015/0132638 A1 | 5/2015 | Adachi et al. |

FOREIGN PATENT DOCUMENTS

| | | | |
|---|---|---|---|
| JP | 2011-76792 A | | 4/2011 |
| JP | 2012-178256 A | | 9/2012 |
| JP | 2012-256446 A | | 12/2012 |
| JP | 2013-8611 A | | 1/2013 |
| JP | 2013008611 A | * | 1/2013 |
| JP | 2013-114966 A | | 6/2013 |
| WO | WO 2011/086983 A1 | | 7/2011 |
| WO | WO 2011/105574 A1 | | 9/2011 |
| WO | WO 2012/073678 A1 | | 6/2012 |
| WO | WO 2013/146896 A1 | | 10/2013 |

OTHER PUBLICATIONS

International Search Report, issued in PCT/JP2015/071641, dated Sep. 8, 2015.
Written Opinion of the International Searching Authority, issued in PCT/JP2015/071641, dated Sep. 8, 2015.

* cited by examiner

ALL SOLID-STATE SECONDARY BATTERY, SOLID ELECTROLYTE COMPOSITION, ELECTRODE SHEET FOR BATTERY USING SAME, METHOD FOR MANUFACTURING ELECTRODE SHEET FOR BATTERY, AND METHOD FOR MANUFACTURING ALL SOLID-STATE SECONDARY BATTERY

CROSS-REFERENCE TO RELATED APPLICATIONS

This application is a Continuation of PCT International Application No. PCT/JP2015/071641 filed on Jul. 30, 2015, which claims priority under 35 U.S.C. § 119 (a) to Japanese Patent Application No. 2014-156839, filed on Jul. 31, 2014. Each of the above applications is hereby expressly incorporated by reference, in its entirety, into the present application.

BACKGROUND OF THE INVENTION

1. Field of the Invention

The present invention relates to an all solid-state secondary battery, a solid electrolyte composition, an electrode sheet for a battery using the same, a method for manufacturing an electrode sheet for a battery, and a method for manufacturing an all solid-state secondary battery.

2. Description of the Related Art

At present, in a number of versatile lithium ion batteries, an electrolytic solution is used. Attempts are underway to substitute this electrolytic solution with a solid electrolyte so as to constitute lithium ion batteries with only solid materials. Among these attempts, techniques of using an inorganic solid electrolyte have an advantage of flame resistance. As electrolytic solutions that are used in lithium ion secondary batteries, flammable materials such as carbonate-based solvents are applied. A variety of countermeasures are being employed; however, still, there is a demand for additional countermeasures for overcharging and the like. A solution to this demand is all solid-state secondary batteries made of an inorganic compound capable of making electrolytes non-flammable.

Another advantage of all solid-state secondary batteries is their suitability for an increase in the energy density by means of electrode stacking. Specifically, electrodes and electrolytes can be directly arranged and serialized in batteries. At this time, metal packages for sealing battery cells and copper lines or busbars for connecting the battery cells may not be provided, and thus it is possible to significantly increase the energy density of batteries. In addition, favorable compatibility with positive electrode materials capable of increasing the potential and the like are also said to be still another advantage.

Due to the respective advantages described above, development of all solid-state secondary batteries as next-generation lithium ion secondary batteries actively proceeds (NEDO technical development organization, fuel batteries and hydrogen technical development department, electricity storage technical development division "NEDO roadmap for technical development of storage batteries for next-generation automobiles 2008" (June 2009)). Meanwhile, in inorganic all solid-state secondary batteries, since a hard solid electrolyte is used, there are also disadvantages that are not found in liquid electrolytes. Examples thereof include an increase in the interface resistance between solid particles. In order to solve this advantage, there are examples in which a specific high-molecular-weight compound is used as a binder. Specifically, in JP2012-178256A, butylene rubber into which an amino group is introduced is used as a binder. JP2011-076792A discloses styrene-butadiene rubber, and JP2010-106252A discloses use of polybutadiene-polyethylene glycol condensation products. JP2013-114966A and JP2013-008611A disclose copolymers of (meth)acrylic acid, styrene, and polyoxyethylene.

SUMMARY OF THE INVENTION

It may be possible to somewhat solve the increase in the interface resistance in all solid-state secondary batteries using the resins disclosed by the respective patent documents described above. However, it is anticipated that binders made of the high-molecular-weight compound disclosed by the above-described publications are incapable of satisfying the current high-level requirement, and thus additional improvement needs to be achieved.

Therefore, an object of the present invention is to provide an all solid-state secondary battery in which an increase in the interface resistance in inorganic solid electrolytes is suppressed and a favorable ion conductivity, a binding property, and furthermore, high-temperature preservation stability are realized, a solid electrolyte composition used for the same, an electrode sheet for a battery using the same, a method for manufacturing an electrode sheet for a battery, and a method for manufacturing an all solid-state secondary battery.

According to the present invention, the following means are provided.

[1] An all solid-state secondary battery comprising: a positive electrode active material layer; a negative electrode active material layer; and a solid electrolyte layer, in which at least any one of the positive electrode active material layer, the negative electrode active material layer, or the solid electrolyte layer includes a binder made up of an inorganic solid electrolyte having a property of conducting ions of a metal belonging to Group I or II of the periodic table and a high-molecular-weight compound satisfying the following conditions (i) to (iii):

(i) A linking structure of a main chain being constituted of a carbon atom (ii) Having a repeating unit represented by any one of Formulae (1-1) to (1-3)

(iii) Having at least one of the following functional group set (a)

(1-1)

(1-2)

(1-3)

in the formulae, $Z^{11}$ to $Z^{14}$ each independently represent a hydrogen atom, an alkyl group, an alkenyl group, an alkynyl group, or an aryl group, two or more of $Z^{11}$ to $Z^{14}$ may be condensed or bonded together and thus form a ring, $Z^{15}$ and $Z^{16}$ each independently represent a hydrogen atom, a halogen atom, an alkyl group, an alkenyl group, an alkynyl group, or an aryl group, functional group set (a)

a carboxyl group, a sulfonic acid group, a phosphoric acid group, a phosphonic acid group, a hydroxyl group, a thiol group, an isocyanate group, an oxetane group, an epoxy group, a dicarboxylic anhydride group, and a silyl group.

[2] The all solid-state secondary battery according to [1], in which a weight-average molecular weight of the high-molecular-weight compound forming the binder is 15,000 to 1,000,000.

[3] The all solid-state secondary battery according to [1] or [2], in which, in the high-molecular-weight compound forming the binder, a content of the repeating unit represented by any one of Formulae (1-1) to (1-3) in a molecule is 80% by mass or more.

[4] The all solid-state secondary battery according to any one of [1] to [3], in which $Z^{11}$ to $Z^{14}$ each are independently a hydrogen atom, an alkyl group having 1 to 18 carbon atoms, an alkenyl group having 2 to 12 carbon atoms, an alkynyl group having 2 to 12 carbon atoms, or an aryl group having 6 to 22 carbon atoms.

[5] The all solid-state secondary battery according to any one of [1] to [4], in which $Z^{15}$ and $Z^{16}$ each independently represent a hydrogen atom, an alkyl group having 1 to 6 carbon atoms, an alkenyl group having 2 to 6 carbon atoms, or an alkynyl group having 2 to 6 carbon atoms.

[6] The all solid-state secondary battery according to any one of [1] to [5], in which the group selected from the functional group set (a) is selected from a carboxyl group, a sulfonic acid group, a phosphoric acid group, a phosphonic acid group, a hydroxyl group, a dicarboxylic anhydride group, and a silyl group.

[7] The all solid-state secondary battery according to any one of [1] to [6], in which the inorganic solid electrolyte is an oxide-based inorganic solid electrolyte.

[8] The all solid-state secondary battery according to [7], in which the inorganic solid electrolyte is selected from compounds of the following formulae:

$Li_{xa}La_{ya}TiO_3$ in the formula, $0.3 \leq xa \leq 0.7$ and $0.3 \leq ya \leq 0.7$ $Li_{xb}La_{yb}Zr_{zb}M^{bb}_{mb}O_{nb}$ in the formula, $M^{bb}$ is at least one element of Al, Mg, Ca, Sr, V, Nb, Ta, Ti, Ge, In, or Sn, $5 \leq xb \leq 10$, $1 \leq yb \leq 4$, $1 \leq zb \leq 4$, $0 \leq mb \leq 2$, and $5 \leq nb \leq 20$ $Li_{xc}B_{yc}M^{cc}_{zc}O_{nc}$ in the formula, $M^{cc}$ is at least one element of C, S, Al, Si, Ga, Ge, In, or Sn, $0 \leq xc \leq 5$, $0 \leq yc \leq 1$, $0 \leq zc \leq 1$, and $0 \leq nc \leq 6$ $Li_{xd}(Al,Ga)_{yd}(Ti,Ge)_{zd}Si_{ad}P_{md}O_{nd}$ in the formula, $1 \leq xd \leq 3$, $0 \leq yd \leq 1$, $0 \leq zd \leq 2$, $0 \leq ad \leq 1$, $1 \leq md \leq 7$, and $3 \leq nd \leq 13$ $Li_{(3-2xe)}M^{ee}_{xe}D^{ee}O$ in the formula, xe represents a number of 0 to 0.1, $M^{ee}$ represents a divalent metal atom, and $D^{ee}$ represents a halogen atom or a combination of two or more halogen atoms $Li_{xf}Si_{yf}O_{zf}$ in the formula, $1 \leq xf \leq 5$, $0 \leq yf \leq 3$, and $1 \leq zf \leq 10$ $Li_{xg}S_{yg}O_{zg}$ in the formula, $1 \leq xg \leq 3$, $0 \leq yg \leq 2$, and $1 \leq zg \leq 10$ $Li_3BO_3$—$Li_2SO_4$ $Li_2O$—$B_2O_3$—$P_2O_5$ $Li_2O$—$SiO_2$ $Li_6BaLa_2Ta_2O_{12}$ $Li_3PO_{(4-3/2w)}N_w$ in the formula, w is $w<1$ $Li_{3.5}Zn_{0.25}GeO_4$ having a LISICON-type crystal structure $La_{0.55}Li_{0.35}TiO_3$ having a perovskite crystal structure $LiTi_2P_3O_{12}$ having a NASICON-type crystal structure, $Li_{(1+xh+yh)}(Al, Ga)_{xh}(Ti, Ge)_{(2-xh)}Si_{yh}P_{(3-yh)}O_{12}$ in the formula, and $Li_7La_3Zr_2O_{12}$ having a garnet-type crystal structure lithium phosphate LiPON obtained by substituting some of oxygen atoms in lithium phosphate with nitrogen $LiPOD^1$ in the formula, $D^1$ is at least one selected from Ti, V, Cr, Mn, Fe, Co, Ni, Cu, Zr, Nb, Mo, Ru, Ag, Ta, W, Pt, or Au $LiA^1ON$ in the formula, $A^1$ is at least one selected from Si, B, Ge, Al, C, Ga, or the like.

[9] A solid electrolyte composition applied to an all solid-state secondary battery comprising: a binder made up of an inorganic solid electrolyte having a property of conducting ions of a metal belonging to Group I or II of the periodic table and a high-molecular-weight compound satisfying the following conditions (i) to (iii):

(i) A linking structure of a main chain being constituted of a carbon atom (ii) Having a repeating unit represented by any one of Formulae (1-1) to (1-3)

(iii) Having at least one of the following functional group set (a)

(1-1)

(1-2)

(1-3)

in the formulae, $Z^{11}$ to $Z^{14}$ each independently represent a hydrogen atom, an alkyl group, an alkenyl group, an alkynyl group, or an aryl group, two or more of $Z^{11}$ to $Z^{14}$ may be condensed or bonded together and thus form a ring, $Z^{15}$ and $Z^{16}$ each independently represent a hydrogen atom, a halogen atom, an alkyl group, an alkenyl group, an alkynyl group, or an aryl group, functional group set (a)

a carboxyl group, a sulfonic acid group, a phosphoric acid group, a phosphonic acid group, a hydroxyl group, a thiol group, an isocyanate group, an oxetane group, an epoxy group, a dicarboxylic anhydride group, and a silyl group.

[10] The solid electrolyte composition according to [9], in which a weight-average molecular weight of the high-molecular-weight compound forming the binder is 15,000 to 1,000,000.

[11] The solid electrolyte composition according to [9] or [10], in which, in the high-molecular-weight compound forming the binder, a content of the repeating unit represented by any one of Formulae (1-1) to (1-3) in a molecule is 80% by mass or more.

[12] The solid electrolyte composition according to any one of [9] to [11], further comprising: a dispersion medium.

[13] The solid electrolyte composition according to [12], in which the dispersion medium is selected from alcohol compound solvents, ether compound solvents, amide compound solvents, ketone compound solvents, aromatic compound solvents, aliphatic compound solvents, and nitrile compound solvents.

[14] The solid electrolyte composition according to any one of [9] to [13], in which a content of the binder is 0.1 parts by mass or more and 20 parts by mass or less with respect to 100 parts by mass of the inorganic solid electrolyte.

[15] The solid electrolyte composition according to any one of [9] to [14], further comprising: a positive electrode active material.

[16] The solid electrolyte composition according to any one of [9] to [15], in which the inorganic solid electrolyte is an oxide-based inorganic solid electrolyte.

[17] An electrode sheet for a battery obtained by forming a film of the solid electrolyte composition according to any one of <9> to <16> on a metal foil.

[18] A method for manufacturing an electrode sheet for a battery, comprising: forming a film of the solid electrolyte composition according to any one of <9> to <16> on a metal foil.

[19] A method for manufacturing an all solid-state secondary battery, comprising: manufacturing an all solid-state secondary battery by way of the method for manufacturing an electrode sheet for a battery according to [18].

In the present specification, when there are multiple substituents or linking groups indicated by a specific reference sign or multiple substituents and the like are simultaneously or selectively defined (when the number of substituents is defined as well), the respective substituents and the like may be identical to or different from each other. In addition, when multiple substituents or the like are close to each other, those may be bonded or condensed together and thus form a ring. At this time, a linking group L described below may be included in the ring.

In the present specification, numerical ranges expressed using "to" include numerical values before and after the "to" as the lower limit value and the upper limit value.

The all solid-state secondary battery of the present invention suppresses an increase in the interface resistance in inorganic solid electrolytes and exhibits excellent performance with which a favorable ion conductivity, a binding property, and furthermore, high-temperature preservation stability are realized. In addition, according to the solid electrolyte composition of the present invention, the electrode sheet for a battery using the same, the method for manufacturing an electrode sheet for a battery, and the method for manufacturing an all solid-state secondary battery, it is possible to preferably manufacture an all solid-state secondary battery exhibiting the above-described excellent performance The above-described and other characteristics and advantages of the present invention will become more evident from the following description with appropriate reference to the accompanying drawings.

DESCRIPTION OF THE PREFERRED EMBODIMENTS

Hereinafter, the present invention will be described in detail. In some cases, constituent requirements described below will be described on the basis of typical embodiments or specific examples, but the present invention is not limited to such embodiments.

Figure 1:
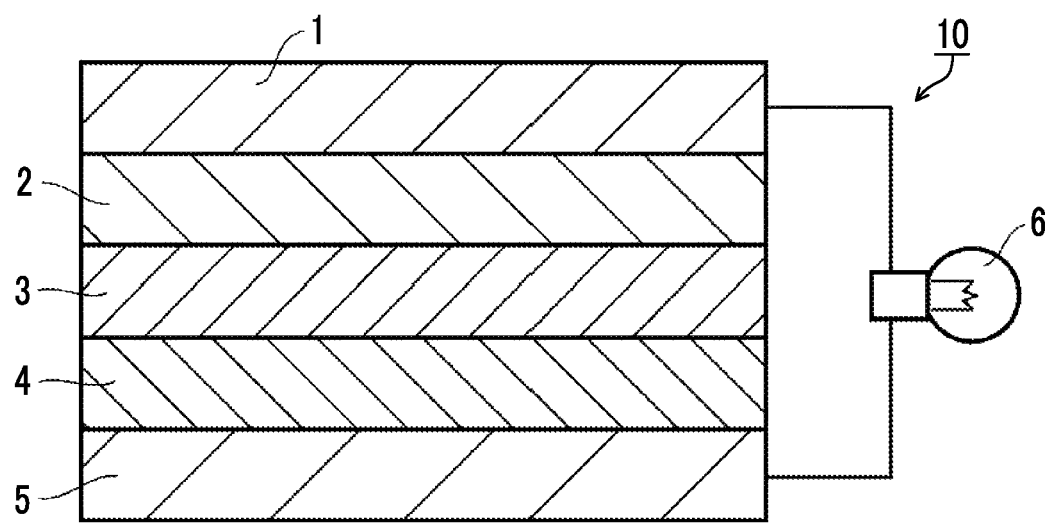
FIG. 1 is a cross-sectional view illustrating a schematic all solid-state lithium ion secondary battery according to a preferred embodiment of the present invention.

FIG. 1 is a cross-sectional view schematically illustrating an all solid-state secondary battery (lithium ion secondary battery) according to a preferred embodiment of the present invention. An all solid-state secondary battery 10 of the present embodiment has a negative electrode collector 1, a negative electrode active material layer 2, an inorganic solid electrolyte layer 3, a positive electrode active material layer 4, and a positive electrode collector 5 in this order from the negative electrode side. The respective layers are in contact with each other and have a laminated structure. Since the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated in the negative electrode return to the positive electrode side, and electrons are supplied to an operation section 6. In the example illustrated in the drawing, an electric bulb is employed as the operation section 6 and is turned on by means of discharging.

In the all solid-state secondary battery of the present invention, a specific binder is used as a constituent material of the negative electrode active material layer, the positive electrode active material layer, and the inorganic solid electrolyte layer. Furthermore, the binder is preferably used as a constituent material of all of the inorganic solid electrolyte layer, the positive electrode active material layer, and the negative electrode active material layer.

The thicknesses of the positive electrode active material layer 4, the solid electrolyte layer 3, and the negative electrode active material layer 2 are not particularly limited. Meanwhile, when the dimensions of ordinary batteries are taken into account, the thicknesses are preferably 10 to 1,000 μm and more preferably 20 μm or more and less than 500 μm. In the all solid-state secondary battery of the present invention, the thickness of at least one layer of the positive electrode active material layer 4, the solid electrolyte layer 3, or the negative electrode active material layer 2 is still more preferably 50 μm or more and less than 500 μm.

<Solid Electrolyte Composition>

(Inorganic Solid Electrolyte)

The inorganic electrolyte refers to a solid electrolyte of an inorganic substance, and solid electrolytes refer to solid-form electrolytes capable of migrating ions in the electrolytes. From this viewpoint, in some cases, inorganic solid electrolytes will be referred to as ion conductive inorganic solid electrolytes in order to differentiate the inorganic solid electrolytes from electrolyte salts described below (supporting electrolytes).

The inorganic solid electrolyte does not include any organic substances (carbon atom) and are thus clearly differentiated from organic solid electrolytes (high-molecular-weight electrolytes represented by PEO and the like and organic electrolyte salts represented by LiTFSI). In addition, the inorganic solid electrolyte is a solid in a normal state and is thus not dissociated or liberated into cations and anions. Due to this point, the inorganic solid electrolyte is also clearly differentiated from inorganic electrolyte salts from which cations and anions are dissociated or liberated in electrolytic solutions or polymers ($LiPF_6$, $LiBF_4$, LiFSI, LiCl, and the like). The inorganic solid electrolyte is not particularly limited as long as the inorganic solid electrolyte has a property of conducting ions of a metal belonging to Group I or II of the periodic table; however, generally, does not have an electron-conducting property.

In the present invention, the inorganic solid electrolyte has a property of conducting ions of a metal belonging to Group I or II of the periodic table. For the inorganic solid electrolyte, it is possible to appropriately select and use a solid electrolyte material that is applied to this kind of products. Representative examples of the inorganic solid electrolyte include (i) sulfide-based inorganic solid electrolytes and (ii) oxide-based inorganic solid electrolytes.

(i) Sulfide-Based Inorganic Solid Electrolyte

The sulfide-based inorganic solid electrolyte preferably contains sulfur (S), has a property of conducting ions of a metal belonging to Group I or II of the periodic table, and has an electron-insulating property. The sulfide-based inorganic solid electrolyte preferably includes at least Li, S, and P as elements and has an electron-conducting property and may include elements other than Li, S, and P depending on purposes or cases.

Examples thereof include lithium ion-conductive inorganic solid electrolytes satisfying a composition represented by General Formula (SE) below.

$$L^{aa}_{a1} M^{aa}_{b1} P_{c1} S_{d1} A^{aa}_{e1} \qquad (SE)$$

In General Formula (SE), $L^{aa}$ represents an element selected from Li, Na, and K and is preferably Li. $M^{aa}$ represents an element selected from B, Zn, Sn, Si, Cu, Ga, Sb, Al, and Ge. Among these, B, Sn, Si, Al, and Ge are preferred, and Sn, Al, and Ge are more preferred. $A^{aa}$ represents I, Br, Cl, or F and is preferably I or Br and particularly preferably I. a1 to e1 represent the compositional ratios of the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.

In General Formula (SE), regarding the compositional ratio of $L^{aa}$, $M^{aa}$, P, S, and $A^{aa}$, it is preferable that b1 and e1 are zero, it is more preferable that b1 and e1 are zero and the proportions (a1:e1:d1) of a1, c1, and d1 are 1 to 9:1:3 to 7, and it is still more preferable that b1 and e1 are zero and a1:e1:d1 are 1.5 to 4:1:3.25 to 4.5. The compositional ratio of the respective elements can be controlled by adjusting the amount of a raw material compound blended to manufacture the sulfide-based inorganic solid electrolyte as described below.

The sulfide-based inorganic solid electrolyte may be amorphous (glassy) or crystalline (glassy ceramic) or may be only partially crystalline. For example, it is possible to use Li—P—S-based glass containing Li, P, and S or Li—P—S-based glass ceramics containing Li, P, and S.

The sulfide-based inorganic solid electrolyte can be manufactured by means of a reaction with [1] lithium sulfide ($Li_2S$) and phosphorus sulfide (for example, phosphorus pentasulfide ($P_2S_5$)), [2] lithium sulfide and at least one of a single phosphorus body or a single sulfur body, or [3] at least one of lithium sulfide, phosphorus sulfide (for example, phosphorus pentasulfide ($P_2S_5$)), a single phosphorus body, or a single sulfur body.

In the Li—P—S-based glass and the Li—P—S-based glass ceramics, the proportions of $Li_2S$ and $P_2S_5$ are preferably 65:35 to 85:15 and more preferably 68:32 to 77:23 in terms of the molar ratio between $Li_2S$ and $P_2S_5$. When the proportions of $Li_2S$ and $P_2S_5$ are set in the above-described range, it is possible to provide a high lithium ion conductivity. Specifically, it is possible to preferably set the lithium ion conductivity to $1 \times 10^{-4}$ S/cm or higher and more preferably set the lithium ion conductivity to $1 \times 10^{-3}$ S/cm or higher. The upper limit thereof is not particularly limited, but is realistically $1 \times 10^{-1}$ S/cm or lower.

Specific examples of the compound include compounds obtained using a raw material composition containing, for example, $Li_2S$ and a sulfide of an element of Groups 13 to 15. Specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, crystalline or amorphous raw material compositions and crystalline and amorphous-mixed raw material compositions which are made of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$SiS_2$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$ have a favorable property of conducting lithium ions, which is preferable. Examples of a method for synthesizing a sulfide solid electrolyte material using the above-described raw material composition include an amorphization method. Examples of the amorphization method include a mechanical milling method and a melting and quenching method, and, among these, the mechanical milling method is preferred since treatments become possible at normal temperature, and manufacturing steps can be simplified.

(ii) Oxide-Based Inorganic Solid Electrolyte

The oxide-based inorganic solid electrolyte contains oxygen (O), has a property of conducting ions of a metal belonging to Group I or II of the periodic table, and preferably has an electron-insulating property.

Specific examples of the compound include $Li_{xa}La_{ya}TiO_3$ [xa satisfies $0.3 \leq xa \leq 0.7$, and ya satisfies $0.3 \leq ya \leq 0.7$] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, $m^b$ satisfies $0 \leq mb \leq 2$, and nb satisfies $5 \leq nb \leq 20$), $Li_{xc}B_{yc}M^{cc}_{zc}O_{nc}$ ($M^{cc}$ is at least one element of C, S, Al, Si, Ga, Ge, In, or Sn, xc satisfies $0 \leq xc \leq 5$, yc satisfies $0 \leq yc \leq 1$, zc satisfies $0 \leq zc \leq 1$, and nc satisfies $0 \leq nc \leq 6$), $Li_{xd}(Al, Ga)_{yd}(Ti, Ge)_{zd}Si_{ad}P_{md}O_{nd}$ (here, $1 \leq xd \leq 3$, $0 \leq yd \leq 1$, $0 \leq zd \leq 2$, $0 \leq ad \leq 1$, $1 \leq md \leq 7$, and $3 \leq nd \leq 13$), $Li_{(3-2xc)}M^{ee}_{xe}D^{ee}O$ (xe represents a number of 0 to 0.1, $M^{ee}$ represents a divalent metal atom, and $D^{ee}$ represents a halogen atom or a combination of two or more halogen atoms), $Li_{xf}Si_{yf}O_{zf}$ ($1 \leq xf \leq 5$, $0 \leq yf \leq 3$, and $1 \leq zf \leq 10$), $Li_{xg}S_{yg}O_{zg}$ ($1 \leq xg \leq 3$, $0 \leq yg \leq 2$, and $1 \leq zg \leq 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w is $w<1$), $Li_{3.5}Zn_{0.25}GeO_4$ having a lithium super ionic conductor (LISICON)-type crystal structure, $La_{0.55}Li_{0.35}TiO_3$ having a perovskite crystal structure, $LiTi_2P_3O_{12}$ having a natrium super ionic conductor (NASICON)-type crystal structure, $Li_{(1+xh+yh)}(Al, Ga)_{xh}(Ti, Ge)_{(2-xh)}Si_{yh}P_{(3-yh)}O_{12}$ (here, $0 \leq xh \leq 1$, and $0 \leq yh \leq 1$), $Li_7La_3Zr_2O_{12}$ (LLZ) having a garnet-type crystal structure, and the like. In addition, phosphorus compounds including Li, P, and O are also desirable. Examples thereof include lithium phosphate ($Li_3PO_4$), LiPON obtained by substituting some of oxygen atoms in lithium phosphate with nitrogen atoms, $LiPOD^1$ ($D^1$ is at least one selected from Ti, V, Cr, Mn, Fe, Co, Ni, Cu, Zr, Nb, Mo, Ru, Ag, Ta, W, Pt, Au, or the like), and the like. In addition, $LiA^1ON$ ($A^1$ is at least one selected from Si, B, Ge, Al, C, Ga, or the like) and the like can also be preferably used.

In the present invention, $Li_{xa}La_{ya}TiO_3$ and $Li_{xb}La_{yb}Zr_{zb}$-$M^{bb}_{mb}O_{nb}$ are preferred since these compounds have a high lithium ion-conducting property and are chemically stable and thus can be easily handled. These compounds may be used singly or in a combined form.

Furthermore, in addition to the above-described compounds, lithium ion-conducting inorganic solid electrolytes satisfying the composition represented by General Formula (SE) are preferred.

In the present invention, among these, the oxide-based inorganic solid electrolyte is preferably used. Since the oxide-based inorganic solid electrolyte generally has a higher hardness, the interface resistance is easily increased in all solid-state secondary batteries, and the application of the oxide-based inorganic solid electrolyte leads to the consequent additional enhancement of the effects. At this time, since the oxide-based inorganic solid electrolyte has oxygen atoms in the structure, a binder having a strong property of being bonded to these oxygen atoms is preferably used. From this viewpoint, a group selected from the functional group set (a) (the specific functional group (a)) is introduced into a high-molecular-weight compound forming a binder described below. Therefore, the binder is more strongly bonded to inorganic solid electrolyte particles, and more favorable performance can be obtained in terms of a decrease in the interface resistance and the like.

The inorganic solid electrolytes may be used singly or in a combined form.

The volume-average particle diameter of the inorganic solid electrolyte particles is not particularly limited, but is preferably 0.01 μM or more and more preferably 0.1 μm or more. The upper limit thereof is preferably 100 μm or less and more preferably 50 μm or less. Meanwhile, the volume-average particle diameter of the inorganic solid electrolyte is measured in the following order. The inorganic solid electrolyte is diluted using water (heptane in a case in which the inorganic solid electrolyte is a substance unstable to water) in a 20 ml sample bottle, thereby preparing 1% by mass of a dispersion liquid. A dispersion liquid specimen after the dispersion is irradiated with 1 kHz ultrasonic waves for ten minutes and is immediately used for testing. This dispersion liquid specimen is used, a laser diffraction/scattering particle size analyzer LA-920 (trade name, manufactured by Horiba Ltd.) is used, and data are imported 50 times using a silica cell for measurement at a temperature of 25° C., thereby obtaining volume-average particle diameters. For other detailed conditions and the like, description in JIS Z8828: 2013 "Particle size analysis-Dynamic light scattering (DLS)" is referred to. Five specimens are produced every level, and the average values are employed.

The concentration of the inorganic solid electrolyte in the solid electrolyte composition is preferably 50% by mass or higher, more preferably 70% by mass or higher, and particularly preferably 90% by mass or higher with respect to 100% by mass of the solid content when the satisfaction of both battery performance and the effect of reducing and maintaining the interface resistance is taken into account. From the same viewpoint, the upper limit thereof is preferably 99.9% by mass or lower, more preferably 99.5% by mass or lower, and particularly preferably 99% by mass or lower. However, when the inorganic solid electrolyte is jointly used with a positive electrode active material or a negative electrode active material described below, the total concentration of the positive electrode active material and the negative electrode active material is preferably in the above-described range.

Meanwhile, in the present specification, the solid content refers to a component that does not disappear due to volatilization or evaporation when a drying treatment is carried out at 160° C. Typically, components other than dispersion media described below are considered as the solid content.

(Binder)

The high-molecular-weight compound forming the binder that is applied to the present invention preferably satisfies the following conditions (i) to (iii) and further satisfies the following conditions (iv) and (v).

Condition (i)

The condition (i) of the specific binder is that the linking structure of the main chain is constituted of carbon atoms. That is, in this high-molecular-weight compound, the continuation of atoms forming the main chain is only constituted of carbon atoms, and, for example, oxygen atoms, sulfur atoms, and nitrogen atoms are not interposed in the continuous structure of the high-molecular-weight compound. This continuation structure of the main chain is preferably constituted of at least any one of an ethylene structure (—$CR_2$—$CR_2$—) or a vinyl structure (—CR=CR—) in which carbonyl groups and the like are not interposed. Therefore, high-molecular-weight compounds having a structure such as polyester, polyamide, or polyol are not in the range of the condition (i). Meanwhile, R in the formula is a hydrogen atom or an arbitrary substituent (examples thereof include substituents T described below).

However, as long as the effects of the present invention are not impaired, a small amount of linking structures other than carbon atoms (for example, hetero linking groups described below) may be present in the high-molecular-weight compound.

Condition (ii)

In the present condition, the high-molecular-weight compound forming the specific binder is defined to have a repeating unit represented by any one of Formulae (1-1) to (1-3).

(1-1)

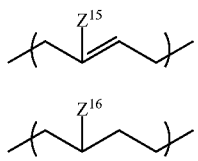
(1-2)

(1-3)

In the formulae, $Z^{11}$ to $Z^{14}$ each independently represent a hydrogen atom, an alkyl group, an alkenyl group, an alkynyl group, or an aryl group. Two or more of $Z^{11}$ to $Z^{14}$ may be condensed or bonded together and thus form a ring. At this time, a linking group L described below may be interposed in $Z^{11}$ to Z14.

$Z^{11}$ to $Z^{14}$ each are independently a hydrogen atom, an alkyl group having 1 to 18 carbon atoms (more preferably having 1 to 12 carbon atoms and particularly preferably having 1 to 6 carbon atoms), an alkenyl group having 2 to 12 carbon atoms (more preferably having 2 to 6 carbon atoms), an alkynyl group having 2 to 12 carbon atoms (more preferably having 2 to 6 carbon atoms), or an aryl group having 6 to 22 carbon atoms (more preferably having 6 to 14 carbon atoms and particularly preferably having 6 to 10 carbon atoms).

In the formulae, $Z^{15}$ and $Z^{16}$ each independently represent a hydrogen atom, a halogen atom, an alkyl group, an alkenyl group, an alkynyl group, or an aryl group. The halogen atom is preferably a fluorine atom or a chlorine atom. The alkyl group preferably has 1 to 18 carbon atoms, more preferably 1 to 12 carbon atoms, and particularly preferably has 1 to 6 carbon atoms. The alkenyl group preferably has 2 to 12 carbon atoms and more preferably 2 to 6 carbon atoms. The alkynyl group preferably has 2 to 12 carbon atoms and more preferably 2 to 6 carbon atoms. The aryl group preferably has 6 to 22 carbon atoms, more preferably 6 to 14 carbon atoms, and particularly preferably has 6 to 10 carbon atoms.

$Z^{15}$ and $Z^{16}$ each are independently a hydrogen atom, an alkyl group having 1 to 6 carbon atoms, an alkenyl group having 2 to 6 carbon atoms, or an alkynyl group having 2 to 6 carbon atoms.

Any group of Formulae (1-1) to (1-3) may be one or more thereof.

Hereinafter, specific examples of the repeating unit represented by any one of Formulae (1-1) to (1-3) will be described, but the present invention is not interpreted to be limited thereto.

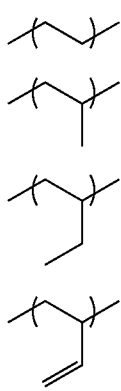

P-1

P-2

P-3

P-4

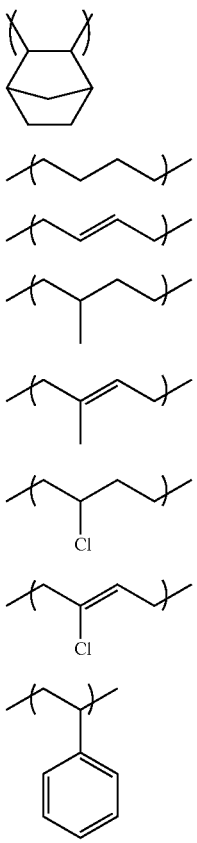

P-5

P-6

P-7

P-8

P-9

P-10

P-11

P-12

P-13

P-14

Condition (iii)

In the present condition, the high-molecular-weight compound forming the specific binder is defined to have at least one group of the following functional group set (a).

Groups included in the functional group set (a) are a carboxyl group (COOH), a sulfonic acid group ($SO_3H$) (including esters), a phosphoric acid group ($OP(O)(OH)_2$) (including esters), a phosphonic acid group ($P(O)(OH)_2$) (including esters), a hydroxyl group, a thiol group (a sulfanyl group), an isocyanate group, an oxetane group, an epoxy group, a dicarboxylic anhydride group, and a silyl group (preferably having 1 to 18 carbon atoms, more preferably having 1 to 12 carbon atoms, and particularly preferably 1 to 6 carbon atoms). Examples of the silyl group include an alkylsilyl group, an alkoxysilyl group, an arylsilyl group, an aryloxysilyl group, and the like, and, among these, an alkoyxsilyl group is preferred. The specific functional group (a) selected from the functional group set (a) may be one or more selected from the above-described group. Meanwhile, when the sulfonic acid group, the phosphoric acid group, and the phosphonic acid group are esters, groups constituting the esters are preferably alkyl groups (having 1 to 12 carbon atoms, more preferably having 1 to 6 carbon atoms, and particularly preferably 1 to 3 carbon atoms), alkenyl groups (having 2 to 12 carbon atoms and more preferably having 2 to 6 carbon atoms), alkenyl groups (having 2 to 12 carbon atoms and more preferably having 2 to 6 carbon atoms), aryl groups (having 6 to 22 carbon atoms, more preferably having 6 to 14 carbon atoms, and particularly preferably 6 to 10 carbon atoms), or aralkyl groups (having 7 to 23 carbon atoms, more preferably having 7 to 15 carbon atoms, and particularly preferably 7 to 11 carbon atoms), and more preferably alkyl groups. Meanwhile, the carboxyl group, the phosphoric acid group, or the sulfonic acid group may form a salt together with an arbitrary counter ion. Examples of the counter ion include alkali metal cations, and quaternary ammonium cations.

The functional group (a) is more preferably selected from a carboxyl group, a sulfonic acid group, a phosphoric acid group, a phosphonic acid group, a hydroxyl group, a dicarboxylic anhydride group, and a silyl group and particularly preferably selected from a sulfonic acid group, a phosphoric acid group, and a phosphonic acid group.

The repeating unit of the functional group (a) is preferably represented by Formula (2) below.

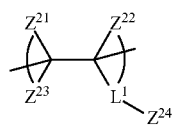

(2)

$Z^{21}$ and $Z^{22}$ each are independently a hydrogen atom, a halogen atom, a cyano group, a methyl group, or an ethyl group.

$Z^{23}$ is a hydrogen atom, a group represented by $Z^{21}$, or a group represented by $L^1$-$Z^{24}$.

$Z^{24}$ is the functional group (a). $L^1$ is a single bond or a linking group L described below. The preferred range thereof is also identical thereto. Meanwhile, the linking group $L^1$ may be appropriately selected in terms of the relationship with the effects of the present invention in consideration of the convenience of synthesis.

Among these, $L^1$ is preferably a single bond, a hydrocarbon linking group (preferably an alkylene group), a hetero linking group (preferably O, $NR^N$, or CO), or a linking group having 1 to 10 linking atoms obtained by combining the above-described groups. Alternatively, $L^1$ is also more preferably a linking structure in which an (oligo)alkylene oxy group (—(Lr—O—)x-: x is preferably an integer of 1 or more and 10,000 or less) is further interposed.

$Z^{21}$ and $Z^{22}$, and $Z^{23}$ and $Z^{24}$ may be bonded or condensed together and thus form a ring. IN addition, $Z^{21}$ to $Z^{24}$ may also further have an arbitrary substituent T as long as the effects of the present invention are exhibited.

The dicarboxylic anhydride group is preferably a group having the structure of Formula (2a) or (2b) below. * is a bonding location. A C—C bond represented by # corresponds to a C—C bond which is incorporated into the main chain of Formula (2). That is, Formula (2b) also illustrates the main chain, but the dicarboxylic anhydride group is the portion of —CO—O—CO—.

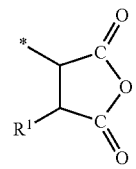

(2a)

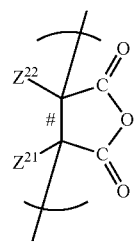

(2b)

Hereinafter, specific examples of a monomer forming the repeating unit represented by Formula (2) will be illustrated, but the present invention is not interpreted to be limited thereto. In the formulae, n is a natural number, preferably 1 to 10,000, more preferably 1 to 8,000, and particularly preferably 1 to 5,000.

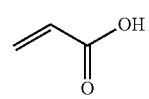

A-1

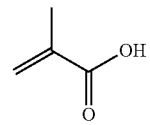

A-2

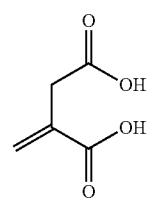

A-3

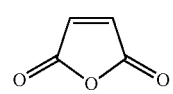

A-4

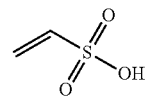

A-5

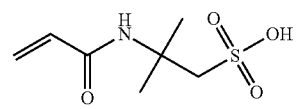

A-6

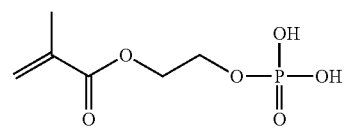

A-7

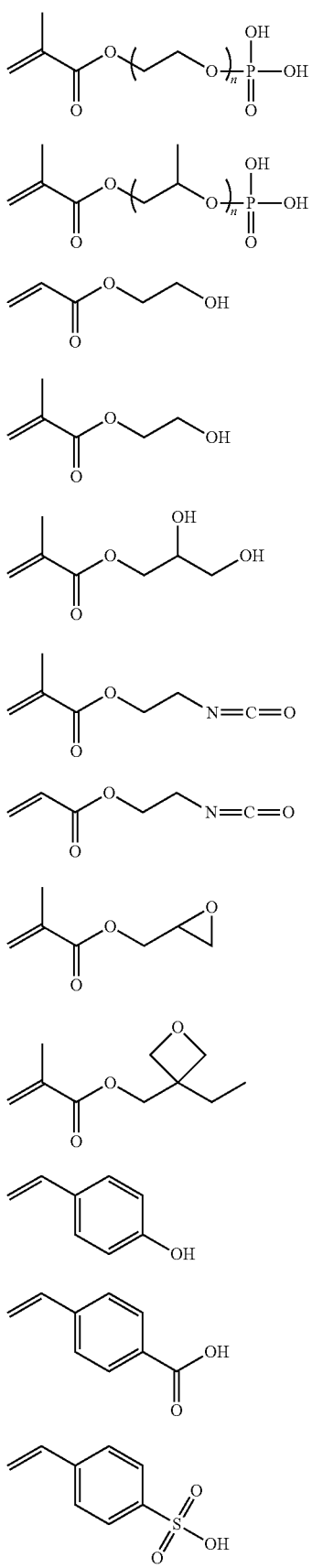
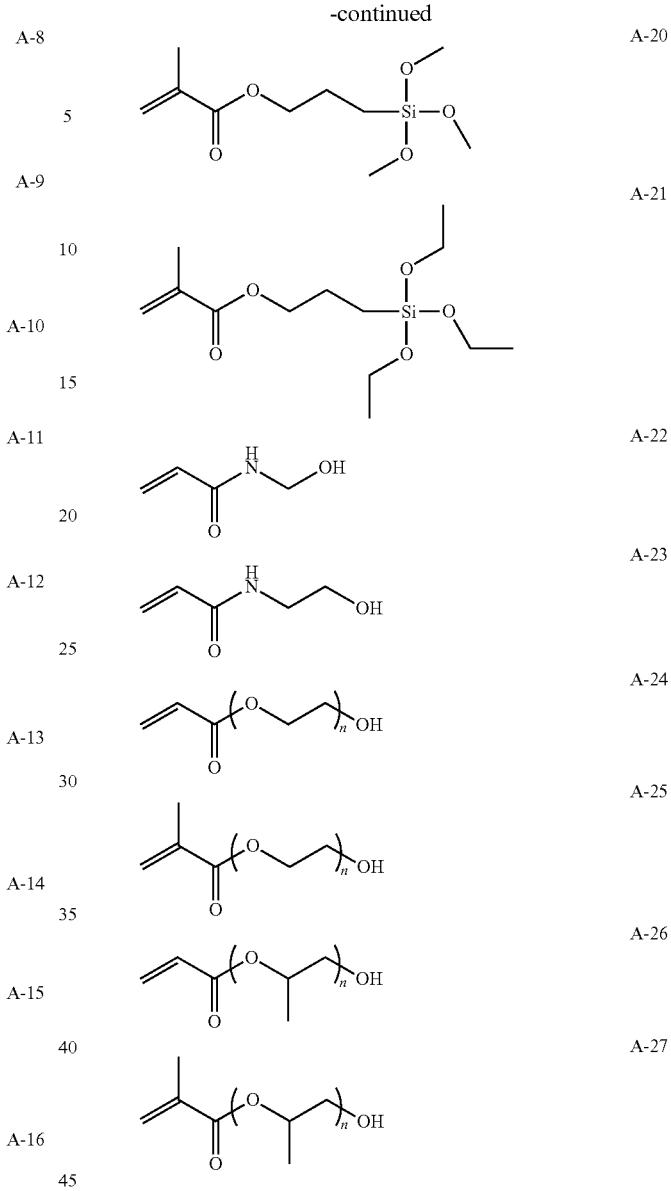

Examples of the method for introducing the functional group (a) include a method in which the monomer serving as the repeating unit of any one of Formulae (1-1) to (1-3) and a monomer having the functional group (a) are reacted and copolymerized together in order to polymerize the high-molecular-compound serving the specific binder (polymer). Alternatively, the functional group may be introduced into a polymer terminal by means of polymerization with a functional group-containing initiator or a chain transfer agent or the functional group may be introduced into a side chain or a terminal by means of a high-molecular-weight reaction (for example, the functional group can be introduced by reacting maleic anhydride with a polymer having the repeating unit or a different functional group can be introduced by means of a reaction with a functional group in a side chain). In addition, a commercially available functional group introduction-type hydrocarbon resin may also be used (for example, TUFTEC M1911 and TUFTEC M1913 manufactured by Asahi Kasei Corporation, SUMIFITT series manufactured by Sumika Chemtex Co., Ltd., DYANRON 4630P and DYNARON 8630P manufactured by JSR Corporation, modified hydrocarbon resins of Nipol LX series manufactured by ZEON Corporation).

The high-molecular-weight compound forming the specific binder is preferably substantially made up of only the repeating unit represented by any one of Formulae (1-1) to (1-3) and the repeating unit represented by Formula (2). For example, since the introduction of a cyano group into the functional group portion makes the structure rigid, the flexibility becomes poor, and the functional groups do not interact with each other, and thus the binding property is expected to become poor. Here, the high-molecular-weight compound being substantially made up of only the repeating unit means that other repeating units may be incorporated into the high-molecular-weight compound as long as the effects of the present invention are exhibited.

Condition (iv)

In the present condition, the weight-average molecular weight of the high-molecular-weight compound serving as the specific binder is defined to be 15,000 to 1,000,000. Furthermore, this molecular weight is preferably 20,000 or more and more preferably 30,000 or more. The upper limit of the molecular weight is preferably 500,000 or less and more preferably 200,000 or less. When the molecular weight of the binder is set in the above-described range, a more favorable binding property is developed, and the handling property (manufacturing aptitude) becomes favorable.

Unless particularly otherwise described, the molecular weight of the high-molecular-weight (polymer) in the present invention refers to the weight-average molecular weight, and a value measured by means of gel permeation chromatography (GPC) in terms of the following standard specimen is employed. Measurement devices and measurement conditions are based on those according to the following condition 1, and the condition 2 can be employed depending on the solubility of specimens and the like. However, depending on the kinds of polymers, more appropriate and proper carriers (eluants) and columns suitable for the carriers may be selected and used.

(Condition 1)
Measurement device: EcoSEC HLC-8320 (trade name, manufactured by Tosoh Corporation)
Columns: Two TOSOH TSKgel Super AWM-H's were connected
Carrier: 10 mM of LiBr/N-methylpyrrolidone
Measurement temperature: 40° C.
Carrier flow rate: 1.0 ml/min
Specimen concentration: 0.1% by mass
Detector: Refractive index (RI) detector
Standard specimen: Polystyrene
(Condition 2)
Measurement device: The same as above
Columns: Columns connecting TOSOH TSKgel Super HZM-H, TOSOH TSKgel Super HZ4000, and TOSOH TSKgel Super HZ2000 were used
Carrier: Tetrahydrofuran
Measurement temperature: 40° C.
Carrier flow rate: 1.0 ml/min
Specimen concentration: 0.1% by mass
Detector: Refractive index (RI) detector
Standard specimen: Polystyrene
Condition (v)

In the present condition, the content of the repeating unit (non-functional group repeating unit) represented by any one of Formulae (1-1) to (1-3) in the molecule is defined to be 80% by mass or more. Furthermore, the copolymerization ratio of this non-functional group repeating unit is preferably 85% by mass or more and more preferably 90% by mass or more. The upper limit thereof is not particularly limited, but is realistically 99.9% by mass or less.

Meanwhile, the copolymerization ratio of this non-functional group repeating unit can be defined using the amount of the monomer blended during the synthesis of the high-molecular-weight compound. In order to measure this copolymerization ratio from the synthesized high-molecular-weight compound, the 13C-NMR quantitative spectrum (inverse gated decoupling method) of the high-molecular-weight compound is measured, and the copolymerization ratio is computed from the integral ratio thereof, whereby the copolymerization ratio can be computed.

Other Conditions

In the high-molecular-weight compound forming the specific binder, the copolymerization ratio of the repeating unit (functional group repeating unit) having the functional group (a) is preferably 0.1% by mass or more, more preferably 0.3% by mass or more, and particularly preferably 0.5% by mass or more. The upper limit thereof is preferably 30% by mass or less, more preferably 20% by mass or less, and particularly preferably 15% by mass or less.

Meanwhile, the copolymerization ratio of the functional repeating unit can be specified using the amount of the monomer blended during the synthesis of the high-molecular-weight compound. In order to measure this copolymerization ratio from the synthesized high-molecular-weight compound, the $^{13}$C-NMR quantitative spectrum (inverse gated decoupling method) of the high-molecular-weight compound is measured, and the copolymerization ratio is computed from the integral ratio thereof, whereby the copolymerization ratio can be computed.

The amount of the binder blended into the solid electrolyte composition is preferably 0.1 parts by mass or more, more preferably 0.3 parts by mass or more, and particularly preferably 0.5 parts by mass or more with respect to 100 parts by mass of the inorganic solid electrolyte (including active materials in a case in which the active materials are used). The upper limit thereof is preferably 30 parts by mass or less, more preferably 20 parts by mass or less, and particularly preferably 10 parts by mass or less.

The amount of the binder in the solid content is preferably 0.1% by mass or more, more preferably 0.3% by mass or more, and particularly preferably 0.5% by mass or more of the solid electrolyte composition. The upper limit thereof is preferably 30% by mass or less, more preferably 20% by mass or less, and particularly preferably 15% by mass or less.

When the amount of the binder is set in the above-described range, it is possible to more effectively satisfy both the fixing property of the inorganic solid electrolyte and the interface resistance-suppressing property.

Meanwhile, as the binder that is applied to the present invention, a binder obtained by combining the above-described specific high-molecular-weight compound and another binder or a variety of additives may be used. The above-described amount of the binder blended is defined as the total amount of the binder, but is preferably considered as the amount of the above-described specific high-molecular-weight compound.

In inorganic all solid-state secondary batteries, since the electrolyte is a solid, the interface resistance between solid particles increases. It is understood that, when a high-molecular-weight compound into which the specific functional group according to the present invention is introduced is employed as the binder, not only the binding property between solid electrolytes but also the connection and fixation between active materials and the solid electrolyte can be realized. Therefore, effects of not only the improvement of close adhesiveness to collectors but also the ensuring of contact between solid electrolytes or between active materials and the solid electrolyte and the consequent decrease in resistance are exhibited. Meanwhile, the main chain of the high-molecular-weight compound is constituted of a linking structure (hydrocarbon resin) of carbon atoms, and appropriate flexibility is maintained, which is also understood to contribute to improvement of the binding property. In addition, what has been described above is also understood to contribute to improvement of stability.

Meanwhile, in the present specification, the expression "compound" (for example, when a substance is called with "compound" in the end) indicates not only the compound but also a salt thereof and an ion thereof. In addition, the expression also indicates a derivative obtained by partially changing the compound by means of the introduction of a substituent thereinto as long as desired effects are exhibited.

In the present specification, substituents which are not clearly indicated whether these substituents are substituted or not substituted may have an arbitrary substituent therein (which also applies to linking groups). What has been described above also applies to compounds which are not clearly indicated whether these compounds are substituted or not substituted. Examples of preferred substituents include substituents T below.

Examples of the substituent T include the following groups.

Examples of the substituent T include alkyl groups (preferably alkyl groups having 1 to 20 carbon atoms, for example, methyl, ethyl, isopropyl, t-butyl, pentyl, heptyl, 1-ethylpentyl, benzyl, 2-ethoxyethyl, 1-carboxymethyl, and the like), alkenyl groups (preferably alkenyl groups having 2 to 20 carbon atoms, for example, vinyl, allyl, oleyl, and the like), alkynyl groups (preferably alkynyl groups having 2 to 20 carbon atoms, for example, ethynyl, butadiynyl, phenylethynyl, and the like), cycloalkyl groups (preferably cycloalkyl groups having 3 to 20 carbon atoms, for example, cyclopropyl, cyclopentyl, cyclohexyl, 4-methylcyclohexyl, and the like), aryl groups (preferably aryl groups having 6 to 26 carbon atoms, for example, phenyl, 1-naphthyl, 4-methoxyphenyl, 2-chlorophenyl, 3-methylphenyl, and the like), heterocyclic groups (preferably heterocyclic groups having 2 to 20 carbon atoms, preferably heterocyclic groups of a 5- or 6-membered ring having at least one oxygen atom, sulfur atom, or nitrogen atom, for example, 2-pyridyl, 4-pyridyl, 2-imidazolyl, 2-benzimidazolyl, 2-thiazolyl, 2-oxazolyl, and the like), alkoxy groups (preferably alkoxy groups having 1 to 20 carbon atoms, for example, methoxy, ethoxy, isopropyloxy, benzyloxy, and the like), aryloxy groups (preferably aryloxy groups having 6 to 26 carbon atoms, for example, phenoxy, 1-naphthyloxy, 3-methylphenoxy, 4-methoxyphenoxy, and the like), alkoxycarbonyl groups (preferably alkoxycarbonyl groups having 2 to 20 carbon atoms, for example, ethoxycarbonyl, 2-ethylhexyl oxycarbonyl, and the like), aryloxycarbonyl groups (preferably aryloxycarbonyl groups having 6 to 26 carbon atoms, for example, phenoxycarbonyl, 1-naphthyloxycarbonyl, 3-methylphenoxycarbonyl, 4-methoxyphenoxycarbonyl, and the like), amino groups (preferably amino groups, alkylamino groups, and arylamino groups which have 0 to 20 carbon atoms, for example, amino, N,N-dimethylamino, N,N-diethylamino, N-ethylamino, anilino, and the like), sulfamoyl groups (preferably sulfamoyl groups having 0 to 20 carbon atoms, for example, N,N-dimethylsulfamoyl, N-phenylsulfamoyl, and the like), acyl groups (preferably acyl groups having 1 to 20 carbon atoms, for example, acetyl, propionyl, butyryl, and the like), aryloyl groups (preferably aryloyl groups having 7 to 23 carbon atoms, for example, benzoyl, and the like), acyloxy groups (preferably acyloxy groups having 1 to 20 carbon atoms, for example, acetyloxy, and the like), aryloyloxy groups (preferably aryloyloxy groups having 7 to 23 carbon atoms, for example, benzoyloxy, and the like), carbamoyl groups (preferably carbamoyl groups having 1 to 20 carbon atoms, for example, N,N-dimethylcarbamoyl, N-phenylcarbamoyl, and the like), acylamino groups (preferably acylamino groups having 1 to 20 carbon atoms, for example, acetylamino, benzoylamino, and the like), alkylthio groups (preferably alkylthio groups having 1 to 20 carbon atoms, for example, methylthio, ethylthio, isopropylthio, benzylthio, and the like), arylthio groups (preferably arylthio groups having 6 to carbon atoms, for example, phenylthio, 1-naphthylthio, 3-methylphenylthio, 4-methoxyphenylthio, and the like), alkylsulfonyl groups (preferably alkylsulfonyl groups having 1 to 20 carbon atoms, for example, methylsulfonyl, ethylsulfonyl, and the like), arylsulfonyl groups (preferably arylsulfonyl groups having 6 to 22 carbon atoms, for example, benzenesulfonyl, and the like), alkylsilyl groups (preferably alkylsilyl groups having 1 to 20 carbon atoms, for example, monomethylsilyl, dimethylsilyl, trimethylsilyl, triethylsilyl, and the like), arylsilyl groups (preferably arylsilyl groups having 6 to 42 carbon atoms, for example, triphenylsilyl, and the like), phosphoryl groups (preferably phosphoryl groups having 0 to 20 carbon atoms, for example, —OP(═O)(R$^P$)$_2$), phosphonyl groups (preferably phosphonyl groups having 0 to 20 carbon atoms, for example, —P(═O)(R$^P$)$_2$), phosphinyl groups (preferably phosphinyl groups having 0 to 20 carbon atoms, for example, —P(R$^P$)$_2$), (meth)acryloyl groups, (meth)acryloyloxy groups, hydroxyl groups, cyano groups, halogen atoms (for example, a fluorine atom, a chlorine atom, a bromine atom, an iodine atom, and the like).

In addition, the respective groups exemplified as the substituent T may be further substituted with the substituent T.

When compounds, substituents, linking groups, or the like have an alkyl group-an alkylene group, an alkenyl group-an alkenylene group, an alkynyl group-an alkynylene group, or the like, these may have a cyclic shape or a chain shape, may be a linear chain or branched, and may be substituted or not substituted.

The respective substituents defined in the present specification may also be substituted through the following linking group L as long as the effects of the present invention are exhibited. For example, the alkyl group-the alkylenen group, the alkenyl group-the alkenylene group, and the like may further have the following hetero linking group interposed in the structure.

The linking group L is preferably a hydrocarbon linking group [an alkylene group having 1 to 10 carbon atoms (more preferably having 1 to 6 carbon atoms and still more preferably having 1 to 3 carbon atoms), an alkenylene group having 2 to 10 carbon atoms (more preferably having 2 to 6 carbon atoms and still more preferably having 2 to 4 carbon atoms), an alkynylene group having 2 to 10 carbon atoms (more preferably having 2 to 6 carbon atoms and still more preferably having 2 to 4 carbon atoms), and an arylene group having 6 to 22 carbon atoms (more preferably having 6 to 10 carbon atoms)], hetero linking groups [a carbonyl group (—CO—), a thiocarbonyl group (—CS—), an ether group (—O—), a thioether group (—S—), an imino group (—NR$^N$—), and an imine linking group (R$^N$—N═C<, —N═C(R$^N$)—)], or a linking group obtained by combining these linking groups. Meanwhile, in a case in which the linking groups are condensed and thus form a ring, the hydrocarbon linking groups may appropriately form a double bond or a triple bond so as to be linked to each other. The ring to be formed is preferably a 5- or 6-membered ring. The 5-membered ring is preferably a nitrogen-containing 5-membered ring, and examples of compounds forming this ring include pyrrole, imidazole, pyrazole, indazole, indole, benzimidazole, pyrrolidine, imidazolidine, pyrazolidine, indoline, carbazole, and derivatives thereof. Examples of the 6-membered ring include piperidine, morpholine, piperazine, and derivatives thereof. In addition, when an aryl group, a heterocyclic group, or the like is included, the ring may be a single ring or a condensed ring and, similarly, may be substituted or not substituted.

$R^N$ is a hydrogen atom or a substituent. The substituent is preferably an alkyl group (preferably having 1 to 24 carbon atoms, more preferably having 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 or 3 carbon atoms), an alkynyl group (preferably having 2 to 24 carbon atoms, more preferably having 2 to 12 carbon atoms, still more preferably having 2 to 6 carbon atoms, and particularly preferably having 2 or 3 carbon atoms), an aralkyl group (preferably having 7 to 22 carbon atoms, more preferably having 7 to 14 carbon atoms, and particularly preferably having 7 to 10 carbon atoms), or an aryl group (preferably having 6 to 22 carbon atoms, more preferably having 6 to 14 carbon atoms, and particularly preferably having 6 to 10 carbon atoms).

$R^P$ is a hydrogen atom, a hydroxyl group, or a substituent. The substituent is preferably an alkyl group (preferably having 1 to 24 carbon atoms, more preferably 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 or 3 carbon atoms), an alkynyl group (preferably having 2 to 24 carbon atoms, more preferably having 2 to 12 carbon atoms, still more preferably having 2 to 6 carbon atoms, and particularly preferably having 2 or 3 carbon atoms), an aralkyl group (preferably having 7 to 22 carbon atoms, more preferably having 7 to 14 carbon atoms, and particularly preferably having 7 to 10 carbon atoms), an aryl group (preferably having 6 to 22 carbon atoms, more preferably having 6 to 14 carbon atoms, and particularly preferably having 6 to 10 carbon atoms), an alkoxy group (preferably having 1 to 24 carbon atoms, more preferably having 1 to 12 carbon atoms, still more preferably having 1 to 6 carbon atoms, and particularly preferably having 1 to 3 carbon atoms), an alkenyloxy group (preferably having 2 to 24 carbon atoms, more preferably having 2 to 12 carbon atoms, still more preferably having 2 to 6 carbon atoms, and particularly preferably having 2 or 3 carbon atoms), an alkynyloxy group (preferably having 2 to 24 carbon atoms, more preferably having 2 to 12 carbon atoms, still more preferably having 2 to 6 carbon atoms, and particularly preferably having 2 or 3 carbon atoms), an aralkyloxy group (preferably having 7 to 22 carbon atoms, more preferably having 7 to 14 carbon atoms, and particularly preferably having 7 to 10 carbon atoms), or an aryloxy group (preferably having 6 to 22 carbon atoms, more preferably having 6 to 14 carbon atoms, and particularly preferably having 6 to 10 carbon atoms).

In the present specification, the number of atoms constituting the linking group is preferably 1 to 36, more preferably 1 to 24, still more preferably 1 to 12, and particularly preferably 1 to 6. The number of linking atoms in the linking group is preferably 10 or less and more preferably 8 or less. The lower limit thereof is one or more. The above-described number of linking atoms refers to the minimum number of atoms which are located on a path connecting predetermined structure portions and contribute to linking. For example, in the case of —$CH_2$—C(=O)—O—, the number of atoms constituting the linking group reaches six, but the number of linking atoms reaches three.

Specific examples of combinations of linking groups include the following combinations: oxycarbonyl groups (OCO), carbonate groups (OCOO), amide groups (CONH), urethane groups (NHCOO), urea groups (NHCONH), (poly)alkyleneoxy groups (—(Lr—O)x-), carbonyl (poly)oxyalkylene groups (—CO—(O—Lr)x-) carbonyl (poly)alkyleneoxy groups (—CO—(Lr—O)x-), carbonyloxy (poly)alkyleneoxy groups (—COO—(Lr—O)x-), (poly)alkyleneimino groups (—(Lr—$NR^N$)x), alkylene (poly)iminoalkylene groups (—Lr—($NR^N$—Lr) x-), carbonyl (poly)iminoalkylene groups (—CO—(NRN—Lr)x-), carbonyl (poly)alkyleneimino groups (—CO—(Lr—$NR^N$)x-), (poly)ester groups (—(CO—O—Lr)x-, —(O—CO—Lr)x-, —(O—Lr—CO)x-, —(Lr—CO—O)x-, —(Lr—O—CO)x-), (poly)amide groups (—(CO—$NR^N$—Lr)x-, —($NR^N$—CO—Lr)x-, —($NR^N$—Lr—CO)x-, —(Lr—CO—$NR^N$)x-, —(Lr—$NR^N$—CO)x-), and the like. x is an integer of 1 or more, preferably 1 to 500, and more preferably 1 to 100.

Lr is preferably an alkylene group, an alkenylene group, or an alkynylene group. The number of carbon atoms in Lr is preferably 1 to 12, more preferably 1 to 6, and particularly preferably 1 to 3. Multiple Lr's, $R^N$'s, $R^P$'s, x's, and the like do not need to be identical to each other. The orientation of the linking group is not limited by what has been described above and may be understood as an orientation appropriately in accordance with a predetermined chemical formula.

(Dispersion Medium)

In the solid electrolyte composition of the present invention, a dispersion medium for dispersing the respective components described above may be used. Examples of the dispersion medium include water-soluble solvents. Specific examples thereof include the following media.

Alcohol compound solvents methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, 1,4-butanediol, and the like.

Ether compound solvents (including ether compounds containing a hydroxyl group)

dimethyl ether, diethyl ether, diisopropyl ether, dibutyl ether, t-butyl methyl ether, cyclohexyl methyl ether, anisole, tetrahydrofuran, diethylene glycol, dipropylene glycol, triethylene glycol, polyethylene glycol, alkylene glycol alkyl ethers (ethylene glycol mono(di)methyl ether, ethylene glycol mono(di)butyl ether, propylene glycol mono(di)methyl ether, diethylene glycol mono(di)methyl ether, dipropylene glycol mono(di)methyl ether, tripropylene glycol mono(di)methyl ether, diethylene glycol mono(di)butyl ether, and the like), and the like.

Amide compound solvents

N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Ketone compound solvents acetone, methyl ethyl ketone, methyl isobutyl ketone, cyclohexanone, and the like.

Aromatic compound solvents benzene, toluene, and the like.

Aliphatic compound solvents hexane, heptane, cyclohexane, methyl cyclohexane, octane, pentane, cyclopentane, decane, and the like.

Nitrile compound solvents acetonitrile and isobutyronitrile.

In the present invention, among these, the ether compound solvents, the ketone compound solvents, the aromatic compound solvents, and the aliphatic compound solvents are preferably used. The boiling point of the dispersion medium at normal pressure (1 atmosphere) is preferably 50° C. or higher and more preferably 80° C. or higher. The upper limit thereof is preferably 220° C. or lower and more preferably 180° C. or lower. The above-described dispersion media may be used singly or in a combined form.

(Positive Electrode Active Material)

Next, a positive electrode active material that is used in a positive electrode composition for the all solid-state secondary battery of the present invention will be described. The positive electrode active material is preferably capable of reversibly intercalating and deintercalating lithium ions. The material thereof is not particularly limited and may be a transition metal oxide, an element that can be complexed with Li such as sulfur, or the like. Among these, a transition metal oxide is preferably used, and a transition metal element $M^a$ (one or more elements selected from Co, Ni, Fe, Mn, Cu, and V) is more preferably included. In addition, a mixing element $M^b$ (an element belonging to Group I (Ia) or II (IIa) of the periodic table which is a metal other than lithium, Al, Ga, In, Ge, Sn, Pb, Sb, Bi, Si, P, B, or the like) may also be mixed thereinto.

Examples of the transition metal element include specific transition metal oxides such as transition metal oxides represented by any one of Formulae (MA) to (ME) below and, as other transition metal oxides, $V_2O_5$, $MnO_2$, and the like. As the positive electrode active material, a particulate positive electrode active material may be used.

Specifically, a transition metal oxide capable of reversibly intercalating and deintercalating lithium ions can be used, and the above-described specific transition metal oxide is preferably used.

Preferred examples of the transition metal oxide include oxides including the above-described transition metal element $M^a$ and the like. At this time, the mixing element $M^b$ (preferably Al) or the like may be mixed thereinto. The amount of the mixing element mixed is preferably 0 to 30 mol % of the amount of the transition metal element. The mixture is more preferably synthesized by mixing Li and $M^a$ so that the molar ratio of Li/$M^a$ reaches 0.3 to 2.2.

[Transition Metal Oxide Represented by Formula (MA) (Bedded Salt-Type Structure)]

A lithium-containing transition metal oxide is more preferably an oxide represented by the following formula.

$$Li_{a1}M^1O_{b1} \quad \text{Formula (MA)}$$

In Formula (MA), $M^1$ is identical to $M^a$, and the preferred range thereof is also identical thereto. a1 represents 0 to 1.2 (preferably 0.2 to 1.2) and is preferably 0.6 to 1.1. b1 represents 1 to 3 and is preferably 2. Part of $M^1$ may be substituted with the mixing element $M^b$.

The transition metal oxide represented by Formula (MA) typically has a bedded salt-type structure.

The transition metal oxide represented by Formula (MA) is more preferably an oxide represented by each of the following formulae.

$$Li_gCoO_K \quad \text{(MA-1)}$$

$$Li_gNiO_K \quad \text{(MA-2)}$$

$$Li_gMnO_K \quad \text{(MA-3)}$$

$$Li_gCo_jNi_{1-j}O_K \quad \text{(MA-4)}$$

$$Li_gNi_jMn_{1-j}O_K \quad \text{(MA-5)}$$

$$Li_gCo_jNi_iAl_{1-j-i}O_K \quad \text{(MA-6)}$$

$$Li_gCo_jNi_iMn_{1-j-i}O_K \quad \text{(MA-7)}$$

Here, g is identical to a1, and the preferred range thereof is also identical thereto. j represents 0.1 to 0.9. i represents 0 to 1. Here, 1-j-I is 0 or more. k is identical to b1, and a preferred range thereof is also identical thereto.

Specific examples of these transition metal compounds include $LiCoO_2$ (lithium cobalt oxide [LCO]), $LiNi_2O_2$ (lithium nickelate), $LiNi_{0.85}Co_{0.01}Al_{0.05}O_2$ (lithium nickel cobalt aluminate [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickel oxide).

When expressed in different manners, preferred examples of the transition metal oxide represented by Formula (MA) include the following oxides although partially duplicated.

$$Li_gNi_{xc}Mn_{yc}Co_{zc}O_2(xc>0.2, yc>0.2, zc≥0, xc+yc+zc=1) \quad \text{(i)}$$

Typical examples:

$$Li_gNi_{1/3}Mn_{1/3}Co_{1/3}O_3$$

$$Li_gNi_{1/2}Mn_{1/2}O_2$$

$$Li_gNi_{xd}Co_{yd}Al_{zd}O_2(xd>0.7, yd>0.1, 0.1>zd≥0.05, xd+yd+zd=1) \quad \text{(ii)}$$

Typical examples:

$$Li_gNi_{0.8}Co_{0.15}Al_{0.05}O_2$$

[Transition metal oxide represented by Formula (MB) (spinel-type structure)]

The lithium-containing transition metal oxide is preferably an oxide represented by Formula (MB) below.

$$Li_{c1}M^2{}_2O_{d1} \quad \text{Formula (MB)}$$

In Formula (MB), $M^2$ is identical to $M^a$, and the preferred range thereof is also identical thereto. c1 represents 0 to 2, is preferably 0.2 to 2, and more preferably 0.6 to 1.5. d1 represents 3 to 5 and is preferably 4.

The transition metal oxide represented by Formula (MB) is more preferably represented by each of the following formulae.

$$Li_mMn_2O_n \quad \text{(MB-1)}$$

$$Li_mMn_pAl_{2-p}O_n \quad \text{(MB-2)}$$

$$Li_mMn_pNi_{2-p}O_n \quad \text{(MB-3)}$$

m is identical to c1, and the preferred range thereof is also identical thereto. n is identical to d1, and the preferred range thereof is also identical thereto. p represents 0 to 2.

Examples of the transition metal oxide include $LiMn_2O_4$ and $LiMn_{1.5}Ni_{0.5}O_4$.

Preferred examples of the transition metal oxide represented by Formula (MB) also include oxides represented by each of the following formulae.

$LiCoMnO_4$ (a)

$Li_2FeMn_3O_8$ (b)

$Li_2CuMn_3O_8$ (c)

$Li_2CrMn_3O_8$ (d)

$Li_2NiMn_3O_8$ (e)

Electrodes including Ni among the above-described transition metal oxides are more preferred from the viewpoint of a high capacitance and a high output.

[Transition Metal Oxide Represented by Formula (MC)]

The lithium-containing transition metal oxide is preferably a lithium-containing transition metal phosphoric oxide, and, among these, lithium-containing transition metal phosphoric oxides represented by Formula (MC) are preferred.

$Li_{e1}M^3(PO_4)_{f1}$  Formula (MC)

In Formula (MC), $e^1$ represented 0 to 2 (preferably 0.2 to 2) and is preferably 0.5 to 1.5. f1 represents 1 to 5 and is preferably 1 to 2.

$M^3$ represents one or more elements selected from the group consisting of V, Ti, Cr, Mn, Fe, Co, Ni, and Cu. $M^3$ may be substituted not only with the mixing element $M^b$ but also with other metals such as Ti, Cr, Zn, Zr, and Nb. Specific examples thereof include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic NASICON-type vanadium phosphate salts such as $Li_3V_2(PO_4)_3$ (lithium vanadium phosphate).

The a1, c1, g, m, and e1 values representing the composition of Li are values changing due to charging and discharging and are typically evaluated with values of a stable state when Li is contained. Formulae (a) to (e) indicate the composition of Li as specific values, and these values, similarly, also change due to the operation of batteries.

[Transition Metal Oxide Represented by Formula (MD)]

The lithium-containing transition metal oxide is preferably a lithium-containing transition metal halogenated phosphoric oxide, and, among these, lithium-containing transition metal halogenated phosphoric oxides represented by Formula (MD) are preferred.

$Li_{g1}M^4(PO_4)_{h1}X_{i1}$  Formula (MD)

In Formula (MD), $g^1$ represented 0 to 3 (preferably 0.2 to 2.5) and is preferably 0.5 to 2. h1 represents 1 to 5 and is preferably 1 to 2. i1 represents 0 to 2 and is preferably 0.5 to 1.5. X is preferably a halogen element and more preferably a fluorine atom.

$M^4$ represents one or more elements selected from the group consisting of V, Ti, Cr, Mn, Fe, Co, Ni, and Cu. $M^4$ may be substituted not only with the mixing element $M^b$ but also with other metals such as Ti, Cr, Zn, Zr, and Nb. Specific examples thereof include iron fluorophosphate such as $Li_2FePO_4F$, manganese fluorophosphate such as $Li_2MnPO_4F$, cobalt fluorophosphates such as $Li_2CoPO_4F$.

[Transition Metal Oxide Represented by Formula (ME)]

The lithium-containing transition metal oxide is preferably a lithium-containing transition metal silicon oxide, and, among these, lithium-containing transition metal silicon oxides represented by Formula (ME) are preferred.

$Li_{j1}M^5(SiO_4)_{k1}$  Formula (ME)

In Formula (ME), j1 represented 0 to 3 (preferably 0.2 to 2.5) and is preferably 0.5 to 2. k1 represents 1 to 5 and is preferably 1 to 2.

$M^5$ represents one or more elements selected from the group consisting of V, Ti, Cr, Mn, Fe, Co, Ni, and Cu. $M^5$ may be substituted not only with the mixing element $M^b$ but also with other metals such as Ti, Cr, Zn, Zr, and Nb. Specific examples thereof include $Li_2FeSiO_4$, $Li_2MnSiO_4$, $Li_2CoSiO_4$, and the like.

The a1, c1, g, m, e1, g1, and j1 values representing the composition of Li are values changing due to charging and discharging and are typically evaluated with values of a stable state when Li is contained. Formulae (a) to (e) indicate the composition of Li as specific values, and these values, similarly, also change due to the operation of batteries.

The average particle diameter (sphere-equivalent average particle diameter) of the positive electrode active material that is used in the all solid-state secondary battery of the present invention is not particularly limited. Meanwhile, the volume-average particle diameter is preferably 0.1 µm to 50 µm. In order for the positive electrode active material to obtain a predetermined particle diameter, an ordinary crusher or classifier may be used. A positive electrode active material obtained using a firing method may be used after being washed with water, an acidic aqueous solution, an alkaline aqueous solution, or an organic solvent. As the average particle diameter of the positive electrode active material particle, the volume-average particle diameter (sphere-equivalent average particle diameter) is measured using a laser diffraction/scattering particle size analyzer LA-920 (trade name, manufactured by Horiba Ltd.).

The concentration of the positive electrode active material is not particularly limited, but is preferably 10% to 90% by mass and more preferably 20% to 80% by mass with respect to 100% by mass of the solid components in the solid electrolyte composition for forming the positive electrode active material layer.

The positive electrode active material may be used singly, or a combination of two or more positive electrode active materials may be used.

In addition, to the positive electrode active material layer, a conduction acid may be appropriately added as necessary. As the conduction aid, conduction aids described below can be used.

(Negative Electrode Active Material)

Next, a negative electrode active material that is used in the composition for a negative electrode for the all solid-state secondary battery of the present invention will be described. The negative electrode active material is preferably capable of reversibly intercalating and deintercalating lithium ions. The material is not particularly limited, and examples thereof include carbonaceous materials, metallic oxides such as tin oxide or silicon oxide, metallic complex oxides, a single lithium body, or lithium alloys such as lithium aluminum alloys, metals capable of forming an alloy with lithium such as Sn, Si, In, and the like. Among these, carbonaceous materials or lithium complex oxides are preferably used from the viewpoint of reliability. In addition, the metallic complex oxides are preferably capable of absorbing and deintercalating lithium. These materials are not particularly limited, but preferably contain titanium and/or lithium as constituent components from the viewpoint of high-current density charge and discharge characteristics.

The carbonaceous material that is used as the negative electrode active material refers to a material substantially made of carbon. Examples thereof include carbonaceous materials obtained by firing petroleum pitch, natural graphite, artificial graphite such as highly oriented pyrolytic graphite, or a variety of synthetic resins such as PAN-based resins or furfuryl alcohol resins. Furthermore, examples thereof also include a variety of carbon fibers such as PAN-based carbon fibers, cellulose-based carbon fibers, pitch-based carbon fibers, vapor grown carbon fibers, dehydrated PVA-based carbon fibers, lignin carbon fibers, glassy carbon fibers, and active carbon fibers, mesophase spherule, graphite whisker, planar graphite, and the like.

These carbonaceous materials can also be classified into non-graphitizable carbonaceous materials and graphite-based carbon materials depending on the degree of graphitization. In addition, the carbonaceous material preferably has a surface separation, a density, and a size of crystallite which are described in JP1987-22066A (JP-S62-22066A), JP1990-6856A (JP-H02-6856A), and JP1991-45473A (JP-H03-45473A). The carbonaceous material does not need to be a single material, and it is also possible to use the mixture of natural graphite and artificial graphite described in JP1993-90844A (JP-H0S-90844A), graphite having a coating layer described in JP1994-4516A (JP-H06-4516A), or the like.

The metallic oxide and the metallic complex oxide which are applied as the negative electrode active material are particularly preferably amorphous oxides, and furthermore, a chalcogenide which is a reaction product between a metallic element and an element belonging to Group XVI of the periodic table is also preferably used. Amorphous oxides mentioned herein refer to oxides having a broad scattering band having a peak in a 2θ value range of 20° to 40° in an X-ray diffraction method in which CuKα rays are used and may have a crystalline diffraction ray. The strongest intensity in the crystalline diffraction ray visible in a 2θ value range of 40° or higher and 70° or lower is preferably 100 or less times and more preferably five or less times the diffraction ray intensity having a peak in a broad scattering band visible in a 2θ value range of 20° or higher and 40° or lower, and the amorphous oxides particularly preferably do not have any crystalline diffraction rays.

Among the above-described amorphous oxides and compound groups made of a chalcogenide, amorphous oxides of a semimetal element and chalcogenides are more preferred, and oxides made of one of elements belonging to Groups XIII (IIIB) to XV (VB) of the periodic table, Al, Ga, Si, Sn, Ge, Pb, Sb, and Bi or a combination of two or more elements therefrom and chalcogenide are particularly preferred. Specific examples of the preferred amorphous oxides and chalcogenides preferably include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, the amorphous oxides and the chalcogenides may be complex oxides with lithium oxide, for example, $Li_2SnO_2$.

The average particle diameter of the negative electrode active material is preferably 0.1 μm to 60 μm. In order to obtain a predetermined particle diameter, a well-known crusher or classifier may be used. For example, a mortar, a ball mill, a sand mill, an oscillatory ball mill, a satellite ball mill, a planetary ball mill, a vortex flow-type jet mill, a sieve, or the like is preferably used. During crushing, wet-type crushing in which water or an organic solvent such as methanol is caused to coexist can be carried out as necessary. In order to obtain a desired particle diameter, the negative electrode active material is preferably classified. The classification method is not particularly limited, and a sieve, a wind classifier, or the like can be used as necessary. Both dry-type classification and wet-type classification can be used. The volume-average particle diameter of the negative electrode active material can be measured using the same method as the above-described method for measuring the volume-average particle diameter of the positive electrode active material. Meanwhile, unless particularly otherwise described, the average particle diameter of the negative electrode active material is measured in the same manner as the average particle diameter of the positive electrode active material.

The chemical formulae of compounds obtained using the above-described firing method can be computed using inductively coupled plasma (ICP) atomic emission spectroscopy as a measurement method or from the different in the mass of the powder before and after firing as a simple method.

Preferred examples of the negative electrode active material that can be jointly used with the amorphous oxide negative electrode active material mainly containing Sn, Si, and Ge include carbon materials capable of absorbing and emitting lithium ions or lithium metals, lithium, lithium alloys, and metals capable of forming alloys with lithium.

Among these, at least one active material represented by Formula (A) below is also preferably included.

$$Si_xM_{(1-x)} \quad \text{Formula (A)}$$

In Formula (A), x represents a number of 0.01 or more and less than 1 and refers to a molar fraction. M represents any one of a chalcogen element, a semi-metal element, an alkali metal element, an alkali rare metal element, and a transition metal element or a combination thereof.

M can preferably be selected from chalcogen elements such as O, S, and Se, semi-metal elements such as B and Ge, alkali metal elements such as Li and Na, alkali rare metal elements such as Mg and Ca, and transition metal elements such as Ti, V, Mn, Fe, Co, Ni, and Cu. In addition, M may be a combination of two or more of these elements.

Among these, chalcogen elements or transition metal elements are preferred, and transition metal elements are more preferred. Among transition metal elements, first transition metal elements are preferred, Ti, V, Mn, Fe, Co, Ni, and Cu are more preferred, and Ti, Mn, Fe, Co, and Ni are particularly preferred.

x is preferably 0.1 or more and less than 1, more preferably 0.1 or more and 0.99 or less, still more preferably 0.2 or more and 0.98 or less, and particularly preferably 0.3 or more and 0.95 or less.

The negative electrode active material also preferably contains a titanium atom. More specifically, $Li_4Ti_5O_{12}$ is preferred since the volume thereof changes only to a small extent during the absorption and deintercalation of lithium ions, and thus $Li_4Ti_5O_{12}$ has excellent rapid charge/discharge characteristics, suppresses deterioration of electrodes, and is capable of improving the service lives of lithium ion secondary batteries. When a specific negative electrode and, furthermore, a specific electrolytic solution are combined together, the stability of secondary batteries improves in a variety of use conditions.

The concentration of the negative electrode active material is not particularly limited, but is preferably 10% to 80% by mass and more preferably 20% to 70% by mass with respect to 100% by mass of the solid content in the solid electrolyte composition.

The negative electrode active materials may be used singly or in a combined form.

In addition, to the negative electrode active material layer, a conduction aid may be appropriately added as necessary. As the conduction aid, it is possible to use conduction aids described below.

(Conduction Aid)

Next, the conduction acid that is used in the present invention will be described. A conduction aid that is known as an ordinary conduction aid can be used. The conduction aid may be, for example, graphite such as natural graphite or artificial graphite, carbon black such as acetylene black, Ketjen black, or furnace black, amorphous carbon such as needle coke, a carbon fiber such as a vapor-grown carbon fiber or a carbon nanotube, or a carbonaceous material such as graphene or fullerene or may be metal powder such as copper or nickel, or a metal fiber, and a conductive polymer such as polyaniline, polypyrrole, polythiophene, polyacetylene, or a polyphenylene derivative may be used. In addition, among these, one conduction aid may be used or two or more conduction acids may be used.

Meanwhile, in the above-described embodiment, examples in which the positive electrode active material or the negative electrode active material may be added to the solid-state electrolyte composition according to the present invention have been described, but the present invention is not interpreted to be limited thereto. For example, as a composition not including the specific binder, paste including a positive electrode active material or a negative electrode active material may be prepared. At this time, it is preferable to add the inorganic solid electrolyte to the paste. The inorganic solid electrolyte layer may be formed using the solid electrolyte composition according to the preferred embodiment of the present invention by combining an ordinarily-used positive or negative electrode material.

<Collectors (Metal Foil)>

As the collectors for the positive and negative electrodes, electron conductors not causing chemical changes are preferably used. The collector for the positive electrode is preferably aluminum, stainless steel, nickel, titanium, and additionally, a collector obtained by treating the surface of aluminum or stainless steel with carbon, nickel, titanium, or silver, and, among these, collectors made of aluminum, an aluminum alloy, or stainless steel are more preferred. The collector for the negative electrode is preferably aluminum, copper, stainless steel, nickel, or titanium, and additionally, a collector obtained by treating an aluminum, stainless steel, or copper surface with carbon, nickel, titanium, or silver and more preferably a collector made of aluminum, copper, a copper alloy, or stainless steel.

As the shape of the collectors, generally, collectors having a film sheet shape are used, but it is also possible to use nets, punched articles, lath bodies, porous bodies, foaming bodies, compacts of fiber groups, and the like. The thicknesses of the collectors are not particularly limited, but are preferably 1 μm to 500 μm. In addition, it is also preferable to impart protrusions and recessed to the collector surface by means of a surface treatment.

<Chassis>

An electrode sheet having the basic structure of the all solid-state secondary battery can be produced by disposing the respective members described above. Depending on use, the all solid-state secondary battery can also be used as an all solid-state secondary battery as it is, but may be further sealed in an appropriate chassis in order to have a dry battery cell form. A metal chassis or a resin (plastic) chassis may be used. In a case in which a metal chassis is used, examples thereof include aluminum alloy chassis and stainless steel chassis. The metal chassis are separately used as the chassis for the positive electrode and the chassis for the negative electrode and are electrically connected to the positive electrode collector and the negative electrode collector respectively. The chassis for the positive electrode and the chassis for the negative electrode are joined together through a gasket for short-circuit prevention and are thus integrated.

<Production of all Solid-State Secondary Battery>

The all solid-state secondary battery may be produced using an ordinary method. Specific examples thereof include methods in which the solid electrolyte composition is applied onto a metal foil which serves as the collector, thereby producing an electrode sheet for a battery having a film formed thereon. For example, a composition which serves as a positive electrode material is applied onto a metal foil, thereby forming a film. Next, a composition of the inorganic solid electrolyte is applied onto the upper surface of the positive electrode active material layer in the electrode sheet for a battery, thereby forming a film. Furthermore, a film of a negative electrode active material is formed in the same manner so as to impart a collector (metal foil) for the negative electrode, whereby it is possible to obtain an electrode sheet having a desired structure of the all solid-state secondary battery. If necessary, a desired all solid-state secondary battery can be produced by sealing the electrode sheet in a chassis. Meanwhile, the respective compositions described above may be applied using an ordinary method. At this time, after the respective application of the composition forming the positive electrode active material layer, the composition forming the inorganic solid electrolyte layer, and the composition forming the negative electrode active material layer, a heating treatment is preferably carried out. The heating temperature is not particularly limited, but is preferably 30° C. or higher and more preferably 60° C. or higher. The upper limit thereof is preferably 300° C. or lower and more preferably 250° C. or lower. When the compositions are heated in the above-described temperature range, it is possible to preferably soften the binder and suppress decomposition. In such a case, in the all solid-state secondary battery, it is possible to obtain a favorable bonding property and a favorable ion-conducting property under no pressurization in the all solid-state secondary battery.

(Dispersion)

The inorganic solid electrolyte composition may be subjected to mechanical dispersion or a crushing treatment. Examples of a method for crushing the inorganic solid electrolyte in the inorganic solid electrolyte composition include a mechanical dispersion method. As the mechanical dispersion method, a ball mill, a beads mill, a planetary mixer, a blade mixer, a roll mill, a kneader, a disc mill, or the like can be used.

Examples of the material of balls in the ball mill include agate, sintered alumina, tungsten carbide, chromium steel, stainless steel, zirconia, plastic polyamide, nylon, silicon nitride, TEFLON (registered trademark), and the like.

As balls that are used during the dispersion using the ball mill, the same kind of balls may be used, or two or more different kinds of balls may be used. During the dispersion, new balls may be added thereto, or the balls may be exchanged with balls having a different shape, size, and material.

The preferred amount of the balls in a container is not particularly specified, and the container may be fully filled with balls.

The amount of contaminants derived from balls or devices which are generated due to impact from mechanical dispersion in the dispersion of the solid electrolyte composition is not particularly specified. The amount of contaminants can also be suppressed to 10 ppm or lower (mass-based).

A single solid electrolyte can be dispersed, or two or more solid electrolytes can be dispersed at the same time.

The dispersion may be carried out in a single stage or in two or more stages. It is also possible to add the active materials, the solid electrolyte, the binder, a dispersant, the dispersion medium, the conduction aid, the lithium salt, and the like between the respective stages. In a case in which the stage varies, it is also possible to change the parameters (the dispersion duration, the dispersion speed, the dispersion base material, and the like) of devices relating to the dispersion.

The dispersion method may be wet-type dispersion in which a dispersion medium is used or dry-type dispersion in which a dispersion medium is not used.

The dispersion medium may dissolve part of the solid electrolyte during dispersion. The dissolved part can also be regenerated as the original solid electrolyte by being heated during drying.

Even in a case in which the dispersion medium is a water-containing solvent (containing 100 ppm or more of moisture (mass-based)), it is also possible to regenerate the inorganic solid electrolyte by heating and drying the dissolved portion after the dispersion or heating and drying the dissolved portion in a vacuum.

The dispersion duration is not particularly specified, but is generally ten seconds to ten days. The dispersion temperature is not particularly specified, but is generally in a range of −50° C. to 100° C.

The average particle diameter of the inorganic solid electrolyte dispersed as described above is generally 0.01 μm or more, 0.05 μm or more, and 0.1 μm or more. The upper limit thereof is generally 500 μm or less, 100 μm or less, 10 μm or less, or 5 μm or less.

Before and after the dispersion step, the shape of the electrode active material may be maintained as it is or changed.

(Coating)

In the solid electrolyte composition that is used in coating, the dispersion medium that is used in the dispersion operation may be used as it is, a different solvent may be added thereto, or a dispersion medium may also be re-dispersed after the solid electrolyte composition is dried.

The solid electrolyte composition that is used in coating may be produced by mixing two or more kinds of slurries including particles with different degrees of dispersion or different particle diameters using the difference of the dispersion process.

To the solid electrolyte composition that is used in coating, the electrode active material may be added after only the solid electrolyte and the dispersion medium are dispersed, or the electrode active material, the inorganic solid electrolyte, and the dispersion medium may be dispersed together. The binder may be added before or after dispersion of the solid electrolyte.

Coating may be any one of wet-type coating and dry-type coating. A bar coating method or the like can be used.

The speed of the coating can be changed depending on the viscosity of the inorganic solid electrolyte composition.

The coating film desirably maintains a uniform film thickness from the beginning to the end of the coating. In the case of coating using a bar coating method, generally, there is a tendency that the coating film is thick in the beginning of the coating and becomes thinner as the coating proceeds and the thickness of the coating film decreases from the central portion to the peripheral portion. In order to prevent the above-described tendency, it is also possible to design the bar coater and the coating table so that the clearance therebetween increases from the beginning of the coating to the end of the coating. In addition, there is another method in which vibrations are imparted before the coated film is fully dried, thereby evening the film thickness of the coated film.

It is also possible to coat the positive electrode layer, the solid electrolyte layer, and the negative electrode layer stepwise while drying these layers or superimpose and coat multiple different layers while these layers remain wet. In a case in which different layers are coated, it is also possible to coat the layers with a solvent that is different from solvents or dispersion mediums that are used to coat adjacent layers.

The number of the kinds of the inorganic solid electrolyte layer may be one or more in sulfides and oxides, element compositions, and crystal structures. In portions in contact with the electrode layers and in the solid electrolyte layer, different solid electrolyte may be used.

(Drying)

In the electrode sheet, the solid electrolyte sheet, a sheet and a battery sheet made up of two or more layers of a combination thereof which have been produced by means of coating, the coating solvent is dried. As the drying method, any method of blow drying, heating drying, vacuum drying, and the like can also be used.

(Pressing)

The coated electrode sheet or the all solid-state secondary battery may be pressurized after being formed or produced. Examples of a pressurization method include a hydraulic cylinder presser and the like. The pressure in the pressurization is generally in a range of 50 MPa to 1,500 MPa. Heating may be carried out at the same time as the pressurization. The heating temperature is generally in a range of 30° C. to 300° C.

The electrode sheet for a battery or the all solid-state secondary battery can be pressed at a temperature higher than the glass transition temperature of the inorganic solid electrolyte.

It is also possible to press the electrode sheet for a battery or the all solid-state secondary battery at a temperature higher than the glass transition temperature of the existing binder. Generally, the pressurization temperature does not exceed the melting point of the binder.

The pressurization may be carried out in a state in which the coating solvent has been dried in advance or may be carried out in a state in which the solvent remains.

The atmosphere during the pressurization may be any one of in the air, in dried air (with a dew point of −20° C. or lower), in an inert gas (for example, argon, helium, nitrogen, or the like), or the like.

Regarding the pressing duration, a high pressure may be applied for a short period of time (for example, several hours or shorter), or an approximately intermediate pressure may be applied for a long period of time (for example, one or more days). In the case of members other than the electrode sheet, for example, batteries, it is also possible to use a restraining device (a screw bracket or the like) of the all solid-state secondary battery in order to continuously apply an approximately intermediate pressure.

The pressing pressure may be uniform or different on the surface of a coated sheet. The pressing pressure can be changed depending on the area or film thickness of a portion to be pressed. In addition, it is also possible to change the pressure in the same position stepwise.

The pressing surface may be flat or be roughened.

(Attachment)

When different layers are attached together, the contact surfaces of both layers are also preferably wetted with an organic solvent, an organic substance, or the like. In the attachment of electrodes, the solid electrolyte layer may be applied to either or both layers and the layer may be attached together before the solid electrolyte layer is dried.

The temperature during the attachment may be room temperature or a temperature which is equal to or higher than room temperature and is close to the glass transition temperature of the solid electrolyte.

(Initialization)

Charging and discharging is carried out in a state in which the pressing pressure has been increased, and then the pressure is released until the pressure reaches a pressure at which the all solid-state battery is generally used.

<Use of all Solid-State Secondary Battery>

The all solid-state secondary battery according to the present invention can be applied to a variety of uses. The application aspect is not particularly limited; however, in a case in which the all solid-state secondary battery is mounted in an electronic device, examples of the application aspect include laptop personal computers, stylus-input personal computers, mobile personal computer, electronic book players, mobile phones, cordless phone extension stations, pagers, handy terminals, portable fax machines, mobile copiers, portable printers, headphone stereos, video movies, liquid crystal televisions, handy cleaners, portable CDs, mini discs, electric shavers, transceivers, electronic organizers, calculators, memory cards, portable tape recorders, radios, backup power supplies, and the like. Additionally, examples of the consumer uses include automobiles, electric vehicles, motors, lighting equipment, toys, game devices, load conditioner, clocks, strobes, cameras, medical devices (pacemakers, hearing aids, shoulder massage machine, and the like), and the like. Furthermore, the all solid-state secondary battery can be used for a variety of military uses and space uses. In addition, the all solid-state secondary battery can be combined with solar batteries.

Among these, the all solid-state secondary battery is preferably applied to applications requiring a high capacitance and high-rate discharge characteristics. For example, in storage facilities and the like in which an increase in the capacitance is anticipated in the future, high reliability become essential, and furthermore, battery performance is also required. In addition, high-capacitance secondary batteries are mounted in electric vehicles and the like, domestic uses in which batteries need to be charged everyday are anticipated, and thus better reliability with respect to excessive charging is required. The present invention is capable of preferably coping with the above-described use aspects and thus exhibiting the excellent effects thereof.

According to the preferred embodiment of the present invention, individual application forms described below are found.

Solid electrolyte compositions (electrode compositions for positive electrodes or negative electrodes) including an active material capable of intercalating and deintercalating ions of a metal belonging to Group I or II of the periodic table Electrode sheets for a battery obtained by applying the solid electrolyte composition onto a metal foil so as to form a film All solid-state secondary batteries including a positive electrode active material layer, a negative electrode active material layer, and an inorganic solid electrolyte layer, in which at least any one of the positive electrode active material layer, the negative electrode active material layer, or the inorganic solid electrolyte layer is a layer constituted of the solid electrolyte composition Methods for manufacturing an electrode sheet for a battery in which the solid electrolyte composition is disposed on a metal foil and is used to form a film Methods for manufacturing an all solid-state secondary battery in which all solid-state secondary batteries are manufactured using the above-described method for manufacturing an electrode sheet for a battery The all solid-state secondary battery refers to a secondary battery in which a positive electrode, a negative electrode, and an electrolyte are all solid. In other words, the all solid-state secondary battery is differentiated from electrolytic solution-type secondary batteries in which a carbonate-based solvent is used as the electrolyte. Among these, the present invention is assumed as an inorganic all solid-state secondary battery. All solid-state secondary batteries are classified into high-molecular-weight all solid-state secondary batteries in which a high-molecular-weight compound such as polyethylene oxide is used as the electrolyte and inorganic all solid-state secondary batteries in which LLT, LLZ, or the like is used. Meanwhile, a high-molecular-weight compound can be applied as a binder for positive electrode active materials, negative electrode active materials, and inorganic solid electrolyte particles without hindering the application of high-molecular-weight compounds to inorganic all solid-state secondary batteries.

The inorganic solid electrolyte is differentiated from an electrolyte in which the above-described high-molecular-weight compound is used as an ion-conducting medium (high-molecular-weight electrolyte), and an inorganic compound serves as an ion-conducting medium. Specific examples thereof include LLT and LLZ described above. The inorganic solid electrolyte does not deintercalate cations (Li ions) for itself and exhibits an ion-transporting function. In contrast, although there are cases in which a material which is added to an electrolytic solution or a solid electrolyte layer and serves as an ion supply source for deintercalating cations (Li ions) is referred to as an electrolyte, when an electrolyte as the ion-transporting material needs to be differentiated, the above-described material is referred to as "electrolyte salt" or "supporting electrolyte". Examples of the electrolyte salt include lithium bistrifluoromethanesulfoneimide (LiTFSI).

"Compositions" mentioned in the present invention refer to mixtures in which two or more components are homogeneously mixed together. Compositions need to be substantially homogeneous and may include agglomerated portions or localized portions as long as desired effects are exhibited. In addition, solid electrolyte compositions mentioned in the present invention refer to compositions which basically serve as materials for forming the electrolyte layer (typically in a paste form), and electrolyte layers formed by curing this composition are not considered as the solid electrolyte composition.

EXAMPLES

Hereinafter, the present invention will be described in more detail on the basis of examples, but the present invention is not interpreted to be limited thereto. In the following examples, "parts" and "%" are mass-based unless particularly otherwise described.

<Synthesis Example of Binder>

Toluene (150 parts), 1,3-butadiene (95 parts), and acrylic acid (5 parts) were added to an autoclave, V-601 (manufactured by Wako Pure Chemical Industries, Ltd., 1 part) was added thereto, and the solution was heated to 80° C. and stirred for three hours. After that, the solution was heated to 90° C., and a reaction was performed until the conversion percentage reached 100%. The obtained solution was re-precipitated in methanol, and the obtained solid was dried, thereby obtaining a target polymer B-1. The weight-average molecular weight was 50,000. Meanwhile, in the present example, the molecular weights are rounded in the hundreds place.

<Hydrogenation Synthesis Example>

After the B-1 obtained above (50 parts) was dissolved in cyclohexane (50 parts) and tetrahydrofuran (THF, 150 parts), the solution was heated to 70° C., n-butyllithium (3 parts), 2,6-di-t-butyl-p-cresole (3 parts), bis(cyclopentadienyl) titanium dichloride (1 part), and diethylaluminum chloride (2 parts) were added thereto, the solution was reacted at a hydrogen pressure of 10 kg/cm² for one hour, distilled away, and dried, thereby obtaining B-2. The weight-average molecular weight was 50,000.

<Maleic Anhydride Modification Example>

Polypropylene (95 parts) was dissolved in xylene (300 parts), maleic anhydride (10 parts) was added thereto, benzoyl peroxide (0.2 g) was added thereto, and the solution was heated at 140° C. for three hours. After the end of the reaction, the solution was cooled to room temperature, then, acetone was injected thereinto, and maleic anhydride-modified polypropylene was precipitated. The obtained maleic anhydride-modified polypropylene was stirred in methyl ethyl ketone so as to remove unreacted maleic anhydride and then was dried, thereby obtaining B-6. The weight-average molecular weight was 25,000, and the amount of the maleic anhydride added was 50% in the reaction.

Individual polymers in Table 1 were prepared by appropriately applying the synthesis orders of the B-1, B-2, and B-6 so as to synthesize a desired substance.

TABLE 1

| No. | M1 | (%) | M2 | (%) | (a) | (%) | Mw |
|---|---|---|---|---|---|---|---|
| B-1 | P-9 | 95 | | | A-1 | 5 | 50,000 |
| B-2 | P-8 | 95 | | | A-1 | 5 | 50,000 |
| B-3 | P-13 | 95 | | | A-1 | 5 | 35,000 |
| B-4 | P-13 | 95 | | | A-13 | 5 | 105,000 |
| B-5 | P-8 | 70 | P-14 | 25 | A-7 | 5 | 80,000 |
| B-6 | P-2 | 95 | | | MAn | 5 | 25,000 |
| B-7 | P-8 | 95 | | | A-7 | 5 | 56,000 |
| B-8 | P-8 | 95 | | | A-15 | 5 | 80,000 |
| B-9 | P-8 | 95 | | | A-6 | 5 | 92,000 |
| B-c1 | P-9 | 100 | | | | | 46,000 |

Binder synthesis example
"%" in the table indicates "% by mass" (corresponding to the copolymerization ratio).
Mw: Weight-average molecular weight
MAn: Maleic anhydride-modified
M1: Repeating unit (1)
M2: Repeating unit (2)
(a): Monomer having a specific functional group (a)

(Preparation Example of Solid Electrolyte Composition)

180 Zirconia beads having a diameter of 5 mm were injected into a 45 mL zirconia container (manufactured by Fritsch Japan Co., Ltd.), an inorganic solid electrolyte LLT (manufactured by Toshima Manufacturing Co., Ltd., 9.7 g), individual binders (0.3 g, solid content weight), and N-methyl pyrrolidone (15.0 g) as a dispersion medium were injected into the container, the container was set in a planetary ball mill manufactured by Fritsch Japan Co., Ltd., the components were continuously mixed at a rotation speed of 300 rpm for two hours, thereby obtaining individual solid electrolyte compositions in the following table.

TABLE 2

| Composition | Solid electrolyte | | Binder | | Dispersion medium |
|---|---|---|---|---|---|
| S-1 | LLT | 97% | B-1 | 3% | Toluene |
| S-2 | LLT | 97% | B-2 | 3% | Toluene |
| S-3 | LLT | 97% | B-3 | 3% | MEK |
| S-4 | LLZ | 97% | B-4 | 3% | MEK |
| S-5 | LLT | 97% | B-5 | 3% | Toluene |
| S-6 | LLT | 97% | B-6 | 3% | Toluene |
| S-7 | LLT | 97% | B-7 | 3% | Toluene |
| S-8 | LLZ | 97% | B-8 | 3% | Toluene |
| S-9 | LLT | 97% | B-9 | 3% | Toluene |
| S-10 | Li/P/S | 97% | B-1 | 3% | Toluene |
| S-11 | Li/P/S | 97% | B-5 | 3% | Toluene |
| S-12 | Li/P/S | 99% | B-5 | 1% | Toluene |
| T-1 | LLT | 97% | B-c1 | 3% | Toluene |
| T-2 | LLT | 97% | BR-A | 3% | Toluene |
| T-3 | LLT | 97% | PEOBR | 3% | Toluene |
| T-4 | LLT | 97% | AA-St-PEO | 3% | Toluene |

<Notes in the table>
Numeric values in the table indicate mass ratios (%). For the serial numbers of compounds, refer to the examples of the above exemplary compounds.
LLT: $Li_{0.33}La_{0.55}TiO_3$
LLZ: $Li_7La_3Zr_2O_{12}$
MEK: Methyl ethyl ketone
Li/P/S: Sulfide solid electrolyte synthesized below Synthesis of Sulfide-Based Inorganic Solid Electrolyte (Li/P/S-Based Glass)

In a glove box in an argon atmosphere (dew point: −70° C.), lithium sulfide ($Li_2S$, manufactured by Sigma-Aldrich Co., LLC., purity>99.98%, 2.42 g) and phosphorus pentasulfide ($P_2S_5$, manufactured by Sigma-Aldrich Co., LLC., purity>99%, 3.90 g) were respectively weighed and put into a mortar. The molar ratio between $Li_2S$ and $P_2S_5$ was set to 75:25 ($Li_2S:P_2S_5$). The components were mixed together for five minutes on the agate mortar using an agate muddler.

After that, 66 zirconia beads having a diameter of 5 mm were put into a 45 mL zirconia container (manufactured by Fritsch Japan Co., Ltd.), the above-described mixture was all put into the container, and the container was fully sealed in an argon atmosphere. The container was set in a planetary ball mill P-7 manufactured by Fritsch Japan Co., Ltd., and mechanical milling was carried out for 20 hours at 25° C. and a rotation speed of 510 rpm, thereby obtaining a sulfide solid electrolyte material (Li/P/S glass) of sulfur powder of (6.20 g).

BR-A

Toluene (500 parts), 1,3-butadiene (99.99 parts), and dimethylaminoethyl methacrylate (0.01 parts) were added to an autoclave, V-601 (manufactured by Wako Pure Chemical Industries, Ltd., 0.3 parts) was added thereto, and the solution was heated to 80° C. and stirred for three hours. After that, the solution was heated to 90° C., and a reaction was performed until the conversion percentage reached 100%. The obtained solution was re-precipitated in methanol, and the obtained solid was dried, thereby obtaining a target polymer BR-A.

PEOBR

α,ω-Polybutadiene dicarboxylate (NISSO-PB C-1000, manufactured by Nippon Soda Co., Ltd., 23 parts) and polyethylene glycol monooleate (25 parts) were added to toluene (300 parts). Concentrated sulfuric acid (0.5 parts) was added thereto, and the mixture was heated and refluxed for nine hours while removing the generated water. After the reaction, the solvent was distilled away until the weight reached 150 parts, and an aqueous solution of $NaHCO_3$ was added thereto. Furthermore, methylene chloride was added thereto, and an organic layer was extracted, condensed, and dried, thereby obtaining PEOBR.

AA-St-PEO

The polymer shown in the table was synthesized according to JP2013-008611A. Specifically, the polymer was synthesized as described below. n-Butyl acrylate (700 parts), styrene (200 parts), methacylic acid (5 parts), divinylbenzene (10 parts), polyoxyethylene lauryl ether (manufactured by KAO Corporation, EMULGEN 108, nonionic surfactant, the number of carbon atoms in an alkyl group is 12, an HLB value of 12.1, 25 parts) as an emulsifier, ion exchange water (1,500 parts), and azobisbutylonitrile (15 parts) as a polymerization initiator were prepared in a 50 kgf/cm$^2$ pressure-resistant autoclave equipped with a stirrer, were sufficiently stirred, and then were heated to 80° C., thereby performing polymerization. In addition, after the initiation of the polymerization, the mixture was cooled when the amount of the monomer consumed reached 99.8% so as to stop the polymerization reaction, thereby obtaining latex having predetermined polymer particles.

(Method for Evaluating Binding Property)

CELLOTAPE having a width of 12 mm and a length of 60 mm (registered trademark) (trade name, manufactured by Nichiban Co., Ltd.) was attached to the solid electrolyte sheet or the positive sheet for a secondary battery, and the binding property was evaluated on the basis of the percentage of the area of a peeled portion when the CELLOTAPE was peeled off 50 mm at a speed of 10 mm/min. The measurement was carried out ten times, and the average value of eight measurement values excluding the maximum value and the minimum value was employed. Five samples for testing were used every level, and the average value thereof was employed. Meanwhile, for the value of the binding property evaluation (Table 4) of the electrolyte sheet, the above-described evaluation results of the positive sheet for a secondary battery were used.

5: 0%
4: Higher than 0% and lower than 5%
3: 5% or higher and lower than 20%
2: 20% or higher and lower than 50%
1: 50% or higher (Production Example of Solid Electrolyte Sheet)

The solid electrolyte composition obtained above was applied onto a 20 μm-thick aluminum foil using an applicator having an arbitrary clearance, was heated at 80° C. for one hour and, furthermore, at 110° C. for one hour, and the coating solvent was dried. After that, the composition was heated and pressurized so as to obtain an arbitrary density using a heat pressing machine, thereby obtaining a solid electrolyte sheet. The film thickness of the electrolyte layer was 30 μm. Other solid electrolyte sheets were also prepared using the same method.

Preparation of Composition for Positive Electrode in Secondary Battery

A positive electrode active material (100 parts by mass) shown in the following table, acetylene black (5 parts by mass), individual solid electrolyte compositions (75 parts by mass) obtained above, and N-methyl pyrrolidone (270 parts by mass) were added to a planetary mixer (TK HIVIS MIX, manufactured by Primix Corporation) and were stirred at 40 rpm for one hour.

Preparation of Composition for Negative Electrode in Secondary Battery

A negative electrode active material (100 parts by mass) shown in the following table, acetylene black (5 parts by mass), individual solid electrolyte compositions (75 parts by mass) obtained above, and N-methyl pyrrolidone (270 parts by mass) were added to a planetary mixer (TK HIVIS MIX, manufactured by Primix Corporation) and were stirred at 40 rpm for one hour.

Production of Positive Electrode Sheet for Secondary Battery

The composition for a positive electrode in a secondary battery obtained above was applied onto a 20 μm-thick aluminum foil using an applicator having a target clearance, was heated at 80° C. for one hour, and furthermore, at 110° C. for one hour, and the coating solvent was dried. After that, the composition was heated and pressurized so as to obtain an arbitrary density using a heat pressing machine, thereby obtaining a positive electrode sheet for a secondary battery.

Production of Secondary Battery Electrode Sheet

The solid electrolyte composition obtained above was applied onto the positive electrode for a secondary battery obtained above using an applicator having an arbitrary clearance and was heated at 80° C. for one hour and, furthermore, at 110° C. for one hour. After that, the composition for a negative electrode in a secondary battery obtained above was further applied and was heated at 80° C. for one hour, and furthermore, at 110° C. for one hour. A 20 vim-thick copper foil was matched onto the negative electrode layer and was heated and pressurized so as to obtain a target density using a heat pressing machine, thereby obtaining a secondary battery electrode sheet. The secondary battery electrode sheet had the constitution of FIG. 1. The film thicknesses of the positive electrode layer and the negative electrode layer were 80 μM, and the film thickness of the electrolyte layer was 30 μM. Other secondary battery electrode sheets were also produced in the same manner.

<Measurement of Ion Conductivity>

A disc-shaped piece having a diameter of 14.5 mm was cut out from the solid electrolyte sheet (Table 3) or the secondary battery electrode sheet (Table 4) which had been obtained above and was put into a stainless steel 2032-type coin case into which a spacer and a washer were incorporated (in a case in which the solid electrolyte sheet was used, additionally, an aluminum foil cut out in a disc shape having a diameter of 14.5 mm was fed into a coin case so as to come into contact with the solid electrolyte layer), thereby producing a coin battery. The coin battery was sandwiched using a holding device capable of applying a pressure between the electrodes and was used for a variety of electrochemical measurements. The pressure between the electrodes was set to 500 kgf/cm$^2$.

Figure 2:
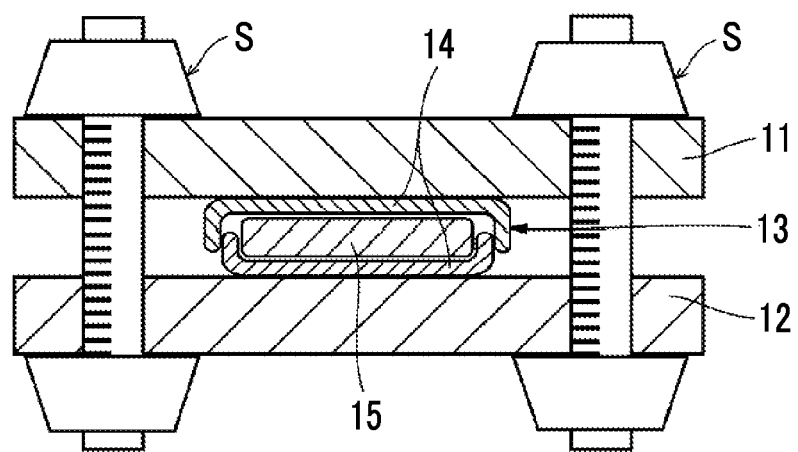
FIG. 2 is a cross-sectional view schematically illustrating a testing device used in examples.

The alternating-current impedance at a voltage amplitude of 5 mV in a frequency range of 1 MHz to 1 Hz was measured in a constant-temperature tank (30° C.) using the coin battery obtained above and a 1255B FREQUENCY RESPONSE ANALYZER manufactured by Solartron Analytical, whereby the resistance in the film thickness direction for specimens was obtained in the above-described manner and was computed using Expression (1) below. At this time, a testing body illustrated in FIG. 2 was used for the pressurization of the battery. A reference sign 11 indicates an upper portion-supporting plate, a reference sign 12 indicates a lower portion-supporting plate, a reference sign 13 indicates the coin battery, a reference sign 14 indicates a coin case, a reference sign 15 indicates a battery sheet (the solid electrolyte sheet or the secondary battery electrode sheet), and a reference sign S indicates a screw.

Ion conductivity(mS/cm)=1000×specimen film thickness (cm)/(resistance (Ω)×specimen area(cm$^2$))  Expression (1)

<High-Temperature Preservation Stability>

After the coin batteries obtained above were left to stand in a constant temperature tank (70° C.) for one week, and the high-temperature preservation stability was obtained from the change percentage of the ion conductivity obtained using the alternating-current impedance method in a constant temperature tank (30° C.). Five samples for testing were used every level, and the average value thereof was employed.

5: 0% or higher and lower than 5%
4: 5% or higher and lower than 15%
3: 15% or higher and lower than 30%
2: 30% or higher and lower than 50%
1: 50% or higher

TABLE 3

| No. | Electrolyte layer | High-temperature preservation stability | Binding property | Ion conductivity (mS/cm) Pressurization | Non-pressurization |
|---|---|---|---|---|---|
| 101 | S-1 | 4 | 5 | 0.15 | 0.13 |
| 102 | S-2 | 5 | 5 | 0.16 | 0.15 |
| 103 | S-3 | 4 | 4 | 0.14 | 0.12 |
| 104 | S-4 | 4 | 5 | 0.14 | 0.13 |
| 105 | S-5 | 5 | 5 | 0.18 | 0.18 |
| 106 | S-6 | 4 | 4 | 0.13 | 0.11 |
| 107 | S-7 | 5 | 5 | 0.18 | 0.17 |
| 108 | S-8 | 5 | 4 | 0.15 | 0.13 |
| 109 | S-9 | 5 | 5 | 0.18 | 0.17 |
| 110 | S-10 | 4 | 4 | 0.38 | 0.34 |
| 111 | S-11 | 4 | 5 | 0.41 | 0.40 |
| 112 | S-12 | 4 | 4 | 0.45 | 0.41 |
| c11 | T-1 | 5 | 1 | 0.11 | 0.04 |
| c12 | T-2 | 4 | 1 | 0.1 | 0.05 |
| c13 | T-3 | 1 | 2 | 0.1 | 0.06 |
| c14 | T-4 | 2 | 2 | 0.12 | 0.08 |

TABLE 4

| No. | Cell constitution Positive electrode layer | Electrolyte layer | Negative electrode layer | High-temperature preservation stability | Binding property | Ion conductivity (mS/cm) Pressurization | Non-pressurization |
|---|---|---|---|---|---|---|---|
| 201 | LMO S-1 | S-1 | Graphite S-1 | 4 | 5 | 0.12 | 0.11 |
| 202 | LMO S-2 | S-2 | LTO S-2 | 5 | 5 | 0.13 | 0.12 |
| 203 | LCO S-2 | S-2 | Graphite S-2 | 5 | 5 | 0.13 | 0.12 |
| 204 | NMC S-5 | S-5 | Graphite S-5 | 5 | 5 | 0.14 | 0.14 |
| 205 | NMC S-6 | S-6 | LTO S-6 | 4 | 4 | 0.11 | 0.1 |
| 206 | LCO S-7 | S-7 | Graphite S-7 | 5 | 5 | 0.14 | 0.13 |
| 207 | NMC S-11 | S-11 | Graphite S-11 | 4 | 4 | 0.35 | 0.31 |
| 208 | NMC S-12 | S-12 | Graphite S-12 | 4 | 5 | 0.38 | 0.37 |
| c21 | NMC T-1 | T-1 | Graphite T-1 | 5 | 1 | 0.09 | 0.03 |
| c22 | NMC T-2 | T-2 | LTO T-2 | 4 | 1 | 0.08 | 0.03 |
| c23 | LCO T-3 | T-3 | Graphite T-3 | 1 | 2 | 0.08 | 0.04 |
| c24 | LCO T-4 | T-4 | Graphite T-4 | 2 | 2 | 0.10 | 0.07 |

<Notes in table>
LMO; $LiMn_2O_4$ lithium manganite
LTO; $Li_4Ti_5O_{12}$ lithium titanate
LCO; $LiCoO_2$ lithium cobalate
NMC; $Li(Ni_{1/3}Mn_{1/3}Co_{1/3})O_2$ nickel, manganese, lithium cobaltate Battery performance was evaluated in the same manner except for the fact that A-3, A-5, A-8, A-11, A-14, A-17, A-19, A-20, and A-26 were used as the functional groups instead of the binder 13-1 (functional group A-1) used in Test 101. As a result, it was confirmed that excellent performance was exhibited in all of the high-temperature preservation stability, the binding property, and the ion conductivity during non-pressurization.

The present invention has been described together with the embodiment, but the present inventors do not mean to limit the present invention to any detailed parts in the description unless particularly otherwise described, and the present invention is supposed to be widely interpreted within the concept and scope of the present invention which are described in the accompanying claims.

EXPLANATION OF REFERENCES

1: negative electrode collector
2: negative electrode active material layer
3: inorganic solid electrolyte layer
4: positive electrode active material layer
5: positive electrode collector
6: operation section
10: all solid-state secondary battery

What is claimed is:

1. An all solid-state secondary battery comprising:
a positive electrode active material layer;
a negative electrode active material layer; and
a solid electrolyte layer,
wherein at least any one of the positive electrode active material layer, the negative electrode active material layer, or the solid electrolyte layer includes a binder made up of an inorganic solid electrolyte having a property of conducting ions of a metal belonging to Group I or II of the periodic table and a high-molecular-weight compound satisfying the following conditions (i) to (iii):
(i) A linking structure of a main chain being constituted of carbon atoms
(ii) Having a repeating unit represented by any one of Formulae (1-1) to (1-3)
(iii) Having at least one of the following functional group set (a)

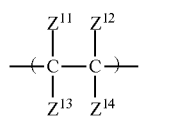

(1-1)

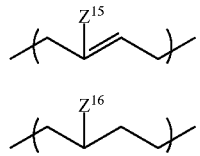

(1-2)

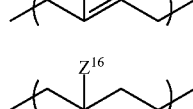

(1-3)

in the formulae, $Z^{11}$ to $Z^{14}$ each independently represent a hydrogen atom, an alkyl group, an alkenyl group, an alkynyl group, or an aryl group, two or more of $Z^{11}$ to $Z^{14}$ may be condensed or bonded together and thus form a ring, $Z^{15}$ and $Z^{16}$ each independently represent a hydrogen atom, a halogen atom, an alkyl group, an alkenyl group, an alkynyl group, or an aryl group, functional group set (a) selected from the group consisting of a sulfonic acid group, a phosphoric acid group, a phosphonic acid group, a thiol group, an isocyanate group, and an oxetane group,
wherein, when a functional group selected from the functional group set (a) is an isocyanate group, the repeating unit represented by Formula (2) is contained,

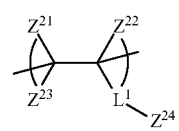

(2)

in the formula, $Z^{21}$ and $Z^{22}$ each are independently a hydrogen atom, a halogen atom, a cyano group, a methyl group, or an ethyl group, $Z^{23}$ is a hydrogen atom, a group represented by $Z^{21}$, or a group represented by $L^1$-$Z^{24}$, $Z^{24}$ is an isocyanate group, $L^1$ is a single bond, or a hydrocarbon linking group, O, $NR^N$, CO, or a linking group obtained by combining any of these linking groups, $R^N$ is a hydrogen atom, an alkyl group, an alkenyl group, an alkynyl group, an aralkyl group, or an aryl group,
wherein a weight-average molecular weight of the high-molecular-weight compound forming the binder is 15,000 to 1,000,000, and
wherein, in the high-molecular-weight compound for forming the binder, a content of the repeating unit represented by any one of Formulae (1-1) to (1-3) in a molecule is 80% by mass or more.

2. The all solid-state secondary battery according to claim 1,
wherein the $L^1$ in Formula (2) is a hydrocarbon linking group, O, $NR^N$, CO, or a linking group obtained by combining any of these linking groups.

3. The all solid-state secondary battery according to claim 1,
wherein $Z^{11}$ to $Z^{14}$ each are independently a hydrogen atom, an alkyl group having 1 to 18 carbon atoms, an alkenyl group having 2 to 12 carbon atoms, an alkynyl group having 2 to 12 carbon atoms, or an aryl group having 6 to 22 carbon atoms.

4. The all solid-state secondary battery according to claim 1,
wherein $Z^{15}$ and $Z^{16}$ each independently represent a hydrogen atom, an alkyl group having 1 to 6 carbon atoms, an alkenyl group having 2 to 6 carbon atoms, or an alkynyl group having 2 to 6 carbon atoms.

5. The all solid-state secondary battery according to claim 1,
wherein the group selected from the functional group set (a) is selected from a sulfonic acid group, a phosphoric acid group, and a phosphonic acid group.

6. The all solid-state secondary battery according to claim 1,
wherein the inorganic solid electrolyte is an oxide-based inorganic solid electrolyte.

7. The all solid-state secondary battery according to claim 6,
wherein the inorganic solid electrolyte is selected from compounds of the following formulae:

$Li_{xa}La_{ya}TiO_3$ in the formula, $0.3 \leq xa \leq 0.7$ and $0.3 \leq ya \leq 0.7$

in the formula, $M^{bb}$ is at least one element of Al, Mg, Ca, Sr, V, Nb, Ta, Ti, Ge, In, or Sn, $5 \leq xb \leq 10$, $1 \leq yb \leq 4$, $1 \leq zb \leq 4$, $0 \leq mb \leq 2$, and $5 \leq nb \leq 20$ $Li_{xc}B_{yc}M^{cc}_{zc}O_{nc}$ in the formula, $M^{cc}$ is at least one element of C, S, Al, Si, Ga, Ge, In, or Sn, $0 \leq xc \leq 5$, $0 \leq yc \leq 1$, $0 \leq zc \leq 1$, and $0 \leq nc \leq 6$ $Li_{xd}(Al,Ga)_{yd}(Ti,Ge)_{zd}Si_{ad}P_{md}O_{nd}$ in the formula, $1 \leq xd \leq 3$, $0 \leq yd \leq 1$, $0 \leq zd \leq 2$, $0 \leq ad \leq 1$, $1 \leq md \leq 7$, and $3 \leq nd \leq 13$ $Li_{(3-2xe)}M^{ee}_{xe}D^{ee}O$ in the formula, xe represents a number of 0 to 0.1, $M^{ee}$ represents a divalent metal atom, and $D^{ee}$ represents a halogen atom or a combination of two or more halogen atoms $Li_{xf}Si_{yf}O_{zf}$ in the formula, $1 \leq xf \leq 5$, $0 \leq yf \leq 3$, and $1 \leq zf \leq 10$ $Li_{xg}S_{yg}O_{zg}$ in the formula, $1 \leq xg \leq 3$, $0 \leq yg \leq 2$, and $1 \leq zg \leq 10$ $Li_3BO_3$—$Li_2SO_4$ $Li_2O$—$B_2O_3$—$P_2O_5$ $Li_2O$—$SiO_2$ $Li_6BaLa_2Ta_2O_{12}$ $Li_3PO_{(4-3/2w)}N_w$ in the formula, w is $w<1$ $Li_{3.5}Zn_{0.25}GeO_4$ having a LISICON-type crystal structure $La_{0.55}Li_{0.35}TiO_3$ having a perovskite crystal structure $LiTi_2P_3O_{12}$ having a NASICON-type crystal structure,
  $Li_{(1+xh+yh)}(Al, Ga)_{xh}(Ti, Ge)_{(2-xh)}Si_{yh}P_{(3-yh)}O_{12}$
in the formula, $0 \leq xh \leq 1$, and $0 \leq yh \leq 1$ $Li_7La_3Zr_2O_{12}$ having a garnet-type crystal structure lithium phosphate LiPON obtained by substituting some of oxygen atoms in lithium phosphate with nitrogen $LiPOD^1$ in the formula, $D^1$ is at least one selected from Ti, V, Cr, Mn, Fe, Co, Ni, Cu, Zr, Nb, Mo, Ru, Ag, Ta, W, Pt, or Au $LiA^1ON$ in the formula, $A^1$ is at least one selected from Si, B, Ge, Al, C, Ga, or the like.

8. A solid electrolyte composition applied to an all solid-state secondary battery comprising:
  a binder made up of an inorganic solid electrolyte having a property of conducting ions of a metal belonging to Group I or II of the periodic table and a high-molecular-weight compound satisfying the following conditions (i) to (iii):
  (i) A linking structure of a main chain being constituted of carbon atoms
  (ii) Having a repeating unit represented by any one of Formulae (1-1) to (1-3)
  (iii) Having at least one of the following functional group set (a)

 (1-1)

 (1-2)

 (1-3)

in the formulae, $Z^{11}$ to $Z^{14}$ each independently represent a hydrogen atom, an alkyl group, an alkenyl group, an alkynyl group, or an aryl group, two or more of $Z^{11}$ to $Z^{14}$ may be condensed or bonded together and thus form a ring, $Z^{15}$ and $Z^{16}$ each independently represent a hydrogen atom, a halogen atom, an alkyl group, an alkenyl group, an alkynyl group, or an aryl group, functional group set (a) selected from the group consisting of a sulfonic acid group, a phosphoric acid group, a phosphonic acid group, a thiol group, an isocyanate group, and an oxetane group, wherein, when a functional group selected from the functional group set (a) is an isocyanate group, the repeating unit represented by Formula (2) is contained,

 (2)

in the formula, $Z^{21}$ and $Z^{22}$ each are independently a hydrogen atom, a halogen atom, a cyano group, a methyl group, or an ethyl group, $Z^{23}$ is a hydrogen atom, a group represented by $Z^{21}$, or a group represented by $L^1$-$Z^{24}$, $Z^{24}$ is an isocyanate group, $L^1$ is a single bond, or a hydrocarbon linking group, O, $NR^N$, CO, or a linking group obtained by combining any of these linking groups, $R^N$ is a hydrogen atom, an alkyl group, an alkenyl group, an alkynyl group, an aralkyl group, or an aryl group, wherein a weight-average molecular weight of the high-molecular-weight compound forming the binder is 15,000 to 1,000,000, and wherein, in the high-molecular-weight compound for forming the binder, a content of the repeating unit represented by any one of Formulae (1-1) to (1-3) in a molecule is 80% by mass or more.

9. The solid electrolyte composition according to claim 8, wherein the $L^1$ in Formula (2) is a hydrocarbon linking group, O, $NR^N$, CO, or a linking group obtained by combining any of these linking groups.

10. The solid electrolyte composition according to claim 8, further comprising:
  a dispersion medium.

11. The solid electrolyte composition according to claim 10, wherein the dispersion medium is selected from alcohol compound solvents, ether compound solvents, amide compound solvents, ketone compound solvents, aromatic compound solvents, aliphatic compound solvents, and nitrile compound solvents.

12. The solid electrolyte composition according to claim 8, wherein a content of the binder is 0.1 parts by mass or more and 20 parts by mass or less with respect to 100 parts by mass of the inorganic solid electrolyte.

13. The solid electrolyte composition according to claim 8, further comprising:
a positive electrode active material.

14. The solid electrolyte composition according to claim 8, wherein the inorganic solid electrolyte is an oxide-based inorganic solid electrolyte.

15. An electrode sheet for a battery obtained by forming a film of the solid electrolyte composition according to claim 8 on a metal foil.

16. A method for manufacturing an electrode sheet for a battery, comprising:
forming a film of the solid electrolyte composition according to claim 8 on a metal foil.

17. A method for manufacturing an all solid-state secondary battery, comprising:
manufacturing an all solid-state secondary battery by way of the method for manufacturing an electrode sheet for a battery according to claim 16.

* * * * *